US012645179B2

(12) United States Patent
Tamura

(10) Patent No.: US 12,645,179 B2
(45) Date of Patent: Jun. 2, 2026

(54) POWDER COLLECTION CONTAINER WITH SWINGING MEMBER CONFIGURED FOR REVERSE CONVEYOR ROTATION

(71) Applicant: Tomonori Tamura, Kanagawa (JP)

(72) Inventor: Tomonori Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/670,963

(22) Filed: May 22, 2024

(65) Prior Publication Data

US 2024/0393731 A1 Nov. 28, 2024

(30) Foreign Application Priority Data

May 23, 2023 (JP) ................................ 2023-084659

(51) Int. Cl.
*G03G 21/12* (2006.01)
*G03G 21/10* (2006.01)

(52) U.S. Cl.
CPC ........... *G03G 21/12* (2013.01); *G03G 21/105* (2013.01); *G03G 2215/0827* (2013.01); *G03G 2221/1624* (2013.01)

(58) Field of Classification Search
CPC .. G03G 21/12; G03G 21/105; G03G 15/0891; G03G 21/0005; G03G 15/08; G03G 21/00; G03G 15/0893; G03G 2215/0827; G03G 2215/0838; G03G 2215/0841; G03G 2221/1624
See application file for complete search history.

(56) References Cited

U.S. PATENT DOCUMENTS

2010/0143011 A1* 6/2010 Tawada ................ G03G 21/007 399/358
2015/0071691 A1* 3/2015 Fujii .................... G03G 21/105 399/350
2016/0342129 A1* 11/2016 Matsumoto ........ G03G 21/0011
2017/0269511 A1 9/2017 Tomita et al.
2018/0032025 A1* 2/2018 Imanaka ................ G03G 21/12
2018/0074440 A1* 3/2018 Nakamura ........... G03G 15/095
2018/0341200 A1* 11/2018 Ohsugi ................ G03G 21/105
2022/0397842 A1 12/2022 Takano
2023/0367255 A1 11/2023 Tamura
2023/0367256 A1 11/2023 Saito et al.

FOREIGN PATENT DOCUMENTS

JP 2012-058521 A 3/2012
JP 2015-036803 A 2/2015
JP 2017-167491 A 9/2017
JP 2021-117435 A 8/2021

* cited by examiner

*Primary Examiner* — Stephanie E Bloss
*Assistant Examiner* — Laura Roth
(74) *Attorney, Agent, or Firm* — XSENSUS LLP

(57) ABSTRACT

A powder collection container includes a powder collection port, a conveyor, and a swinging member. The powder collection port receives powder. The conveyor rotates in a specified direction to convey the powder and includes a shaft and a blade spirally wound around the shaft. The swinging member contacts the conveyor, is swingable, and has a plurality of overhang portions arranged in an axial direction of the swinging member. Each of the plurality of overhang portions having a bent portion bent toward the blade. The bent portion has a tip to contact the blade at least when the conveyor rotates in a direction opposite to the specified direction.

19 Claims, 13 Drawing Sheets

POWDER COLLECTION CONTAINER WITH SWINGING MEMBER CONFIGURED FOR REVERSE CONVEYOR ROTATION

CROSS-REFERENCE TO RELATED APPLICATION

This patent application is based on and claims priority pursuant to 35 U.S.C. § 119(a) to Japanese Patent Application No. 2023-084659, filed on May 23, 2023, in the Japan Patent Office, the entire disclosure of which is hereby incorporated by reference herein.

BACKGROUND

Technical Field

Embodiments of the present disclosure relate to a powder collection container, an image forming apparatus, and a powder conveying device.

Related Art

In an image forming apparatus using an electrophotographic method, such as copiers and printers, some technologies have been known in which a powder conveying device that conveys powder such as toner and waste toner is disposed in, for example, a cleaning device. Untransferred toner remaining (adhered) on the surface of an image bearer such as a photoconductor drum or an intermediate transfer belt is collected by the cleaning device. The untransferred toner collected in the cleaning device is conveyed to the outside of the cleaning device by a conveying screw (serving as the powder conveying device) disposed in the cleaning device. The untransferred toner discharged to the outside is conveyed to a waste toner container and collected as waste toner in the waste toner container. In addition, a swinging member is also known that contacts a blade portion of a conveying screw and swings to prevent waste toner from accumulating.

SUMMARY

In an embodiment of the present disclosure, a powder collection container includes a powder collection port, a conveyor, and a swinging member. The powder collection port receives powder. The conveyor rotates in a specified direction to convey the powder and includes a shaft and a blade spirally wound around the shaft. The swinging member contacts the conveyor, is swingable, and has a plurality of overhang portions arranged in an axial direction of the swinging member. Each of the plurality of overhang portions having a bent portion bent toward the blade. The bent portion has a tip to contact the blade at least when the conveyor rotates in a direction opposite to the specified direction.

In another embodiment of the present disclosure, an image forming apparatus includes the powder collection container.

In still another embodiment of the present disclosure, a powder conveying device includes a conveyor and a swinging member. The conveyor rotates in a specified direction to convey the powder and includes a shaft and a blade spirally wound around the shaft. The swinging member contacts the conveyor, is swingable, and has a plurality of overhang portions arranged in an axial direction of the swinging member. Each of the plurality of overhang portions having a bent portion bent toward the blade. The bent portion has a tip to contact the blade at least when the conveyor rotates in a direction opposite to the specified direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
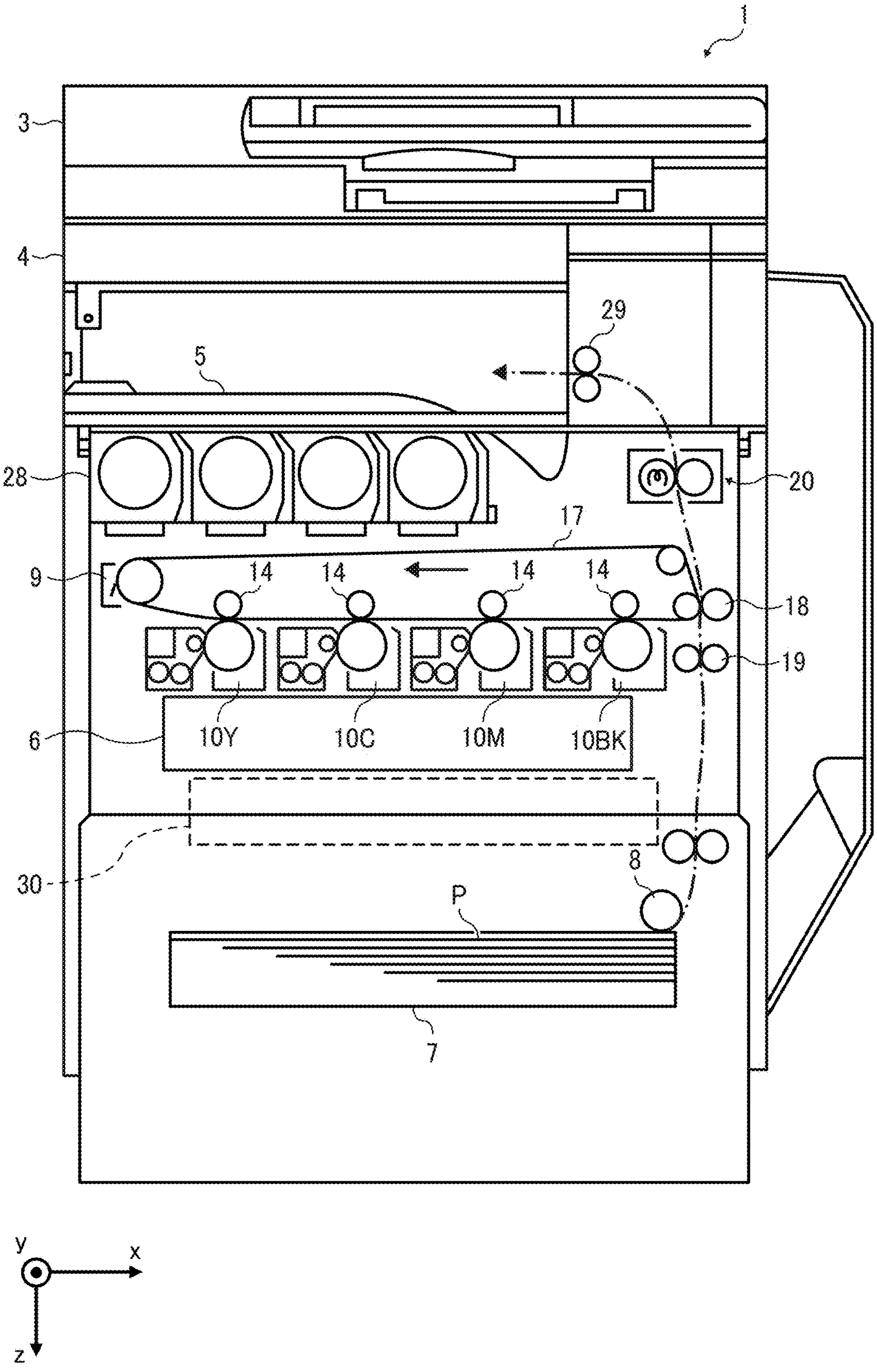
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. In the drawings for illustrating embodiments of the present disclosure, like elements or like components in function or shape are given like reference signs as far as distinguishable, and overlapping descriptions may be omitted. As used herein, the singular forms "a," "an," and "the" are intended to include the plural forms as well, unless the context clearly indicates otherwise.

First, with reference to FIG. 1, a description is given of an overall configuration and an operation of an image forming apparatus 1 according to an embodiment of the present disclosure. Here, in FIG. 1, a horizontal direction of FIG. 1 is set as an x axis, a direction perpendicular to the plane on which FIG. 1 is illustrated is set as a y axis, and a vertical direction of FIG. 1 is set as a z axis. Note that the definition of coordinates is the same in the following drawings unless otherwise specified.

In FIG. 1, the image forming apparatus 1, which is illustrated as a color copier in the present embodiment, includes a document conveying device 3, a scanner 4 (document reading device), and a writing device 6 (exposure device). The document conveying device 3 conveys documents to the scanner 4. The scanner 4 scans the documents to read image data. The writing device 6 emits a laser beam based on input image data. The image forming apparatus 1 also includes a sheet feeder 7, process cartridges 10Y, 10M, 10C, and 10BK, an intermediate transfer belt 17 (an image bearer), and a secondary transfer roller 18. The sheet feeder 7 stores sheets P such as sheets of paper. The process cartridges 10Y, 10M, 10C, and 10BK are image forming devices to form toner images of yellow, magenta, cyan, and black, respectively. The toner images of multiple colors are transferred and superimposed one on another onto the intermediate transfer belt 17. The secondary transfer roller 18 transfers the toner images on the intermediate transfer belt 17 onto the sheet P. The image forming apparatus 1 further includes a fixing device 20, toner containers 28, and a waste-toner collection container 30. The fixing device 20 fixes unfixed toner images on the sheet P. The toner containers 28 contain toners of respective colors to be supplied to corresponding developing devices 13 of the process cartridges 10Y, 10M, 10C, and 10BK. Waste-toner (an example of powder) is collected in the waste-toner collection container 30. The waste-toner collection container 30 is an example of a powder collection container and may also be referred to as a collection bottle.

Figure 2:
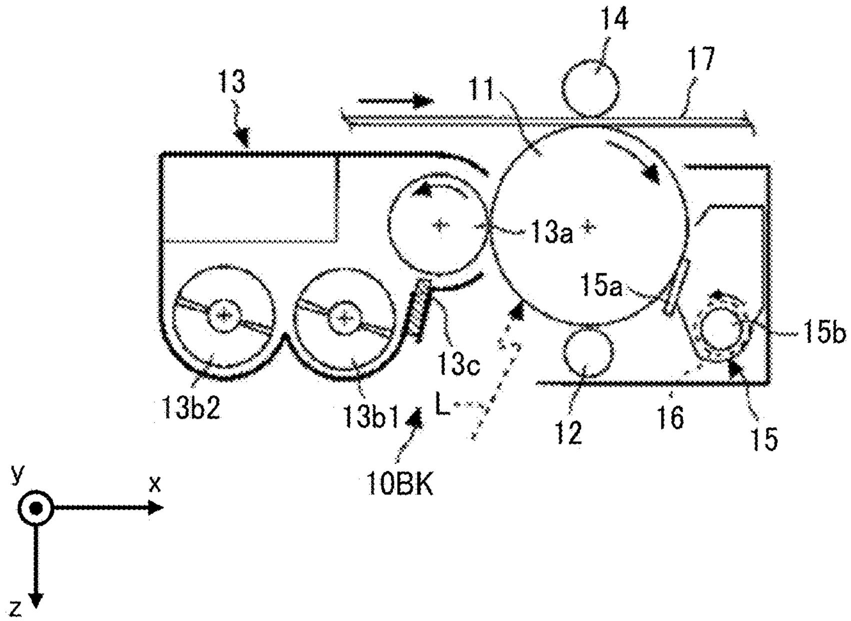
FIG. 2 is a schematic view of an image forming device.

Each of the process cartridges 10Y, 10M, 10C, and 10BK (serving as image forming devices) includes a photoconductor drum 11 (serving as an image bearer), a charging device 12, the developing device 13, and a cleaning device 15, which are integrated as a single unit as illustrated in FIG. 2. Each of the process cartridges 10Y, 10M, 10C, and 10BK, which is expendable, is replaced with a new one when depleted. Yellow, magenta, cyan, and black toner images are formed on the respective photoconductor drums 11 (serving as image bearers) in the process cartridges 10Y, 10M, 10C, and 10BK. Note that in this specification, yellow, magenta, cyan, and black may be represented as Y, M, C, and BK, respectively.

A description is given below of operations of the image forming apparatus 1 to form a normal color toner image.

Conveying rollers of the document conveying device 3 convey a document on a document table onto an exposure glass of the scanner 4. The scanner 4 optically scans the document on the exposure glass to read image data. The yellow, magenta, cyan, and black image data are transmitted to the writing device 6. The writing device 6 irradiates the photoconductor drums 11 of the corresponding process cartridges 10Y, 10M, 10C, and 10BK with laser beams L (exposure light) based on the yellow, magenta, cyan, and black image data, respectively.

Meanwhile, the four photoconductor drums 11 rotate clockwise as illustrated in FIGS. 1 and 2. With reference to FIG. 2, the charging device 12 (charging roller) uniformly charges a surface of the photoconductor drum 11 at a position opposite the photoconductor drum 11 (charging process). Thus, the surface of the photoconductor drum 11 is charged to a certain potential. Subsequently, the surface of the photoconductor drum 11 thus charged reaches a position where the surface of the photoconductor drum 11 is irradiated with the laser beam L. The writing device 6 emits the laser beams L for respective colors from a light source according to the image data. The laser beams L are reflected by a polygon mirror and transmitted through multiple lenses. The laser beams L transmitted through the multiple lenses passes through different optical passages for the different color components of yellow, magenta, cyan, and black (exposure process).

The laser beam L corresponding to the yellow image data is emitted to the surface of the photoconductor drum 11 in the process cartridge 10Y, which is the first from the left in FIG. 1 among the four process cartridges 10Y, 10M, 10C, and 10BK. Thus, an electrostatic latent image for yellow is formed on the photoconductor drum 11 charged by the charging device 12 (charging roller). Similarly, the laser beam L corresponding to the cyan image data is emitted to the surface of the photoconductor drum 11 in the second process cartridge 10C from the left in FIG. 1, thus forming an electrostatic latent image corresponding to the cyan image data on the surface of the photoconductor drum 11. The laser beam L corresponding to the magenta image data is emitted to the surface of the photoconductor drum 11 in the third process cartridge 10M from the left in FIG. 1, thus forming an electrostatic latent image corresponding to the magenta image data on the surface of the photoconductor drum 11. The laser beam L corresponding to black image data is emitted to the surface of the photoconductor drum 11 in the fourth process cartridge 10BK from the left in FIG. 1, thus forming an electrostatic latent image corresponding to the black image data on the surface of the photoconductor drum 11.

Then, the surface of the photoconductor drum 11 having the electrostatic latent image reaches a position opposite the developing device 13 (see FIG. 2). The developing device 13 supplies toner of each color onto the surface of the photoconductor drum 11 and develops the electrostatic latent image on the photoconductor drum 11 into a toner image (development process). Subsequently, the surface of the photoconductor drum 11 after the development process reaches a position opposite the intermediate transfer belt 17 (intermediate transferor) as image bearer. Each of primary transfer rollers 14 is disposed at the position where the surface of the photoconductor drum 11 faces the intermediate transfer belt 17 such that the primary transfer roller 14 contacts an inner circumferential surface of the intermediate transfer belt 17. At the positions of the primary transfer rollers 14, the toner images on the photoconductor drums 11 are sequentially transferred to and superimposed on the intermediate transfer belt 17, forming a multicolor toner image thereon (primary transfer process).

After the primary transfer process, the surface of the photoconductor drum 11 reaches a position opposite the cleaning device 15 (see FIG. 2). The cleaning device 15 collects untransferred toner remaining on the photoconductor drum 11 (cleaning process). Then, the surface of the photoconductor drum 11 passes through a discharging device to complete a series of image forming processes performed on the photoconductor drum 11.

Meanwhile, the surface of the intermediate transfer belt 17, onto which the single-color toner images on the photoconductor drums 11 are transferred and superimposed, moves in a direction indicated by an arrow in FIG. 1 and reaches a position opposite a secondary transfer roller 18. The secondary transfer roller 18 secondarily transfers the multicolor toner image on the intermediate transfer belt 17 onto the sheet P (secondary transfer process). After the secondary transfer process, the surface of the intermediate transfer belt 17 reaches a position opposite an intermediate transfer belt cleaner 9 (cleaning device). The intermediate transfer belt cleaner 9 collects the untransferred toner on the intermediate transfer belt 17 to complete a series of transfer processes on the intermediate transfer belt 17.

The sheet P is conveyed from the sheet feeder 7 to the position of the secondary transfer roller 18 via, for example, a sheet conveyance guide and a registration roller pair 19. More specifically, a feed roller 8 feeds the sheet P from the sheet feeder 7 that stores a stack of sheets P, and the sheet P is then guided by the sheet conveyance guide to the registration roller pair 19. The sheet P that has reached the registration roller pair 19 is conveyed toward the position of the secondary transfer roller 18 so that the sheet P coincides with the arrival of the multicolor toner image on the intermediate transfer belt 17.

Subsequently, the sheet P, onto which the multicolor image is transferred, is conveyed to the fixing device 20. The fixing device 20 includes a fixing roller and a pressure roller pressing against each other. In a nip between the fixing roller and the pressure roller, the multicolor toner image is fixed on the sheet P. After the fixing process, an output roller pair 29 ejects the sheet P as an output image to the exterior of a body of the image forming apparatus 1 (also simply referred to as a body in the present specification), and the ejected sheets P are stacked on an output tray 5 to complete a series of image forming processes.

Next, with reference to FIG. 2, image forming devices of the image forming apparatus 1 are described in detail below. FIG. 2 is a schematic view of the process cartridge 10BK for black. The other three process cartridges 10Y, 10M, and 10C have a similar configuration as the process cartridge 10BK for black except for the color of toner used in the image forming process, and thus drawings and descriptions thereof are omitted to avoid redundancy.

As illustrated in FIG. 2, the process cartridge 10BK is a single unit that includes the photoconductor drum 11 as the image bearer, the charging device 12 to charge the photoconductor drum 11, the developing device 13 to develop the electrostatic latent image on the photoconductor drum 11, and the cleaning device 15 to remove the untransferred toner from the photoconductor drum 11 in a casing of the process cartridge 10BK.

The photoconductor drum 11 is an organic photoconductor designed to be charged with a negative polarity and includes a photosensitive layer formed on a drum-shaped conductive support. The charging device 12 is a charging roller including a conductive core and an elastic layer of moderate resistivity overlaid on the conductive core. A power supply applies a specified voltage to the charging device 12 (charging roller). Thus, the charging device 12 uniformly charges the surface of the photoconductor drum 11 facing the charging device 12.

The developing device 13 includes a developing roller 13*a* disposed opposite the photoconductor drum 11, a first conveying screw 13*b*1 disposed opposite the developing roller 13*a*, a second conveying screw 13*b*2 disposed opposite the first conveying screw 13*b*1 via a partition, and a doctor blade 13*c* disposed opposite the developing roller 13*a*. The developing roller 13*a* includes multiple magnets and a sleeve that rotates around the magnets. The magnets are stationary and generate magnetic poles around the circumferential surface of the developing roller 13*a*. The magnets generate a plurality of magnetic poles on the developing roller 13*a* (sleeve) to bear developer on the developing roller 13*a*. The developing device 13 stores two-component developer including carrier and toner.

The cleaning device 15 is provided with a cleaning blade 15*a* that contacts the photoconductor drum 11 and a conveying screw 15*b* (a conveyance tube 16) that conveys the untransferred toner collected in the cleaning device 15 toward a waste-toner conveying device 40 (see FIG. 3) as waste toner. For example, the cleaning blade 15*a* is made of rubber, such as urethane rubber, and contacts the surface of the photoconductor drum 11 at a specified angle with a specified pressure. With this configuration, substances such as the untransferred toner adhering to the photoconductor drum 11 are mechanically scraped off and collected in the cleaning device 15. The untransferred toner collected in the cleaning device 15 is conveyed to the waste-toner conveying device 40 (see FIG. 3) as the toner conveying device via the conveyance tube 16 in which the conveying screw 15*b* is disposed and conveyed to a waste-toner collection container 30 by the waste-toner conveying device 40. The conveyed untransferred toner is collected in the waste-toner collection container 30 as the waste toner. Similarly, with reference to FIG. 1, the intermediate transfer belt cleaner 9 as a cleaning device is also provided with a cleaning blade and a conveying screw. The cleaning blade contacts the intermediate transfer belt 17. The conveying screw (conveyance tube 16) conveys the untransferred toner collected in the intermediate transfer belt cleaner 9 toward the waste-toner conveying device 40 (see FIG. 3) as waste toner. The untransferred toner collected in the intermediate transfer belt cleaner 9 is conveyed to the waste-toner conveying device 40 (see FIG. 3) as the developer conveying device via the conveyance tube 16 in which a conveying screw is disposed, and conveyed to the waste-toner collection container 30 by the waste-toner conveying device 40. The conveyed untransferred toner is collected in the waste-toner collection container 30 as the waste toner. In addition to the untransferred toner, substances adhering to the photoconductor drum 11 or the intermediate transfer belt 17 include paper dust resulting from the sheet P, discharge products generated on the photoconductor drum 11 during discharge by the charging device 12, additives to the toner, and the like. In the present specification, such substances are collectively referred to as the "untransferred toner".

The image forming processes, described above, are described in further detail below with reference to FIG. 2. The developing roller 13*a* rotates in a direction (counterclockwise) indicated by an arrow in FIG. 2. In the developing device 13, as the first conveying screw 13*b*1 and the second conveying screw 13*b*2 arranged with the partition interposed therebetween rotate, the developer is circulated in the longitudinal direction of the developing device 13, while being stirred and mixed with toner supplied from the toner container 28 by a toner supply device. The longitudinal direction of the developing device 13 is perpendicular to the plane on which FIG. 2 is illustrated, and is a direction (y axis direction) indicated by the y axis in FIG. 2.

Thus, the toner is triboelectrically charged and attracted to the carrier. The toner is borne on the developing roller 13*a* together with the carrier. The developer borne on the developing roller 13*a* reaches a position opposite the doctor blade 13*c*. After having been adjusted to an appropriate amount at the position of the doctor blade 13*c*, the developer on the developing roller 13*a* then comes to an opposing position to the photoconductor drum 11 (i.e., a development area). In the development area, the toner in the developer adheres to the electrostatic latent image formed on the surface of the photoconductor drum 11. The toner adheres to the electrostatic latent image (i.e., the toner image is formed) by a development electric field formed by a potential difference (i.e., a developing potential) between a latent image potential (i.e., an exposure potential) of an image area irradiated with the laser beam L and a developing bias applied to the developing roller 13*a*. Subsequently, most of the toner attached to the photoconductor drum 11 in the developing process is transferred onto the intermediate transfer belt 17. The untransferred toner remained on the surface of the photoconductor drum 11 is collected in the cleaning device 15 by the cleaning blade 15*a*.

A detailed description is given below of the waste-toner conveying device 40 as the toner conveying device of the image forming apparatus 1 according to the present embodiment.

Figure 3:
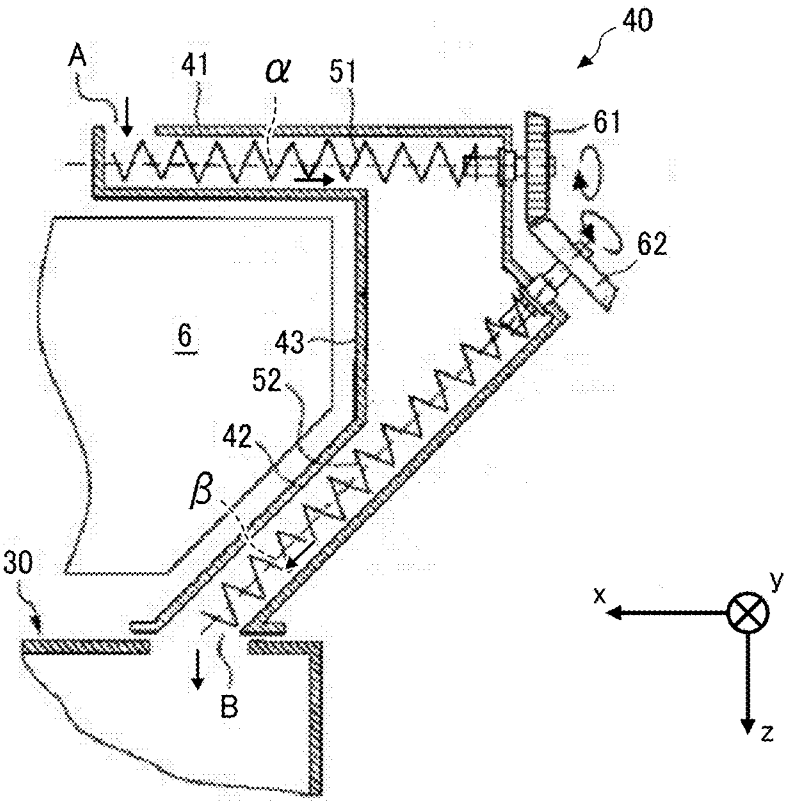
FIG. 3 is a view of a waste toner conveyance device.

FIG. 3 is a diagram illustrating a waste-toner conveying device. Note that when FIG. 1 is the diagram illustrating the front side of the image forming apparatus 1, FIG. 3 is a diagram illustrating the waste-toner conveying device when viewed from the rear side (a negative side of the y axis of FIG. 1). A description is given of the waste-toner conveying device, with reference to FIG. 3.

As illustrated in FIG. 3, waste toner is the toner (developer) that is collected by the cleaning devices 15 and the intermediate transfer belt cleaner 9 and flows into the waste-toner conveying device 40 from an inlet port A via the conveyance tube 16. The waste-toner conveying device 40 as the toner conveying device discharges the waste toner toward the waste-toner collection container 30 from an outlet port B. Specifically, the waste toner (toner) is conveyed in a direction indicated by a black arrow in FIG. 3 in the waste-toner conveying device 40.

The waste-toner collection container 30 is detachably (replaceably) attached in the body of the image forming apparatus 1. When the waste-toner collection container 30 is attached to the body of the image forming apparatus 1, the waste-toner collection container 30 is communicatively coupled with the waste-toner conveying device 40 (an inclined conveyance passage 42). The waste toner that has been conveyed by the waste-toner conveying device 40 is collected in the waste-toner collection container 30.

As illustrated in FIG. 3, the waste-toner conveying device 40 (toner conveying device) is provided with a horizontal conveyance passage 41, a drop conveyance passage 43, and the inclined conveyance passage 42 along the conveyance direction of the waste toner indicated by a black arrow. The inlet port A is disposed at a top portion of the horizontal conveyance passage 41 on the upstream side of the horizontal conveyance passage 41 in the conveyance direction. The outlet port B is disposed at a bottom portion of the inclined conveyance passage 42 on the downstream side of the inclined conveyance passage 42 in the conveyance direction.

Since there is a layout limitation in the body of the image forming apparatus 1, the waste-toner conveying device 40 is configured by combining a plurality of conveyance passages extending in different directions instead of a conveying passage directly connecting the inlet port A and the outlet port B. Specifically, in the present embodiment, as illustrated in FIG. 1, the horizontal conveyance passage 41, the drop conveyance passage 43, and the inclined conveyance passage 42 are disposed to avoid the writing device 6 located above the waste-toner collection container 30 in the image forming apparatus 1.

The drop conveyance passage 43, in which waste toner (toner) falls by its own weight, extends in a substantially vertical direction in the present embodiment. The drop conveyance passage 43 in the present embodiment is formed so that the horizontal cross section is rectangular.

The drop conveyance passage 43 may be provided with a member for preventing toner from accumulating in the conveyance passage.

Note that this member may be any member as long as the drop conveyance passage 43 drops the waste toner by its own weight, and examples thereof include a flexible sheet. Note that the drop conveyance passage 43 may be formed so as to extend in a substantially vertical direction, and the toner may be made to slide down on an inclined surface inclined with respect to the vertical direction so as to drop by its own weight.

The inclined conveyance passage 42 is connected to a lower end of the drop conveyance passage 43 and extends diagonally downward (from upper right to lower left in FIG. 3). That is, the inclined conveyance passage 42 is disposed to intersect with the drop conveyance passage 43 at a specified inclination angle. In the present embodiment, the inclined conveyance passage 42 is substantially cylindrical.

The inclined conveyance passage 42 is internally provided with an inclined conveying coil 52 as a coil-shaped conveyor (first conveyor) that rotates in a specified direction to convey waste toner (toner) obliquely downward. With reference to FIG. 3, the inclined conveying coil 52 serving as a conveyor is made of a metal material. An upstream end (upper right end in FIG. 3) of a coil portion spirally wound in a specified direction is joined to a shaft of the inclined conveying coil 52 by welding. A bevel gear 62 is disposed on the shaft of the inclined conveying coil 52. The bevel gear 62 meshes with a bevel gear 61 of a horizontal conveying coil 51 to be described below and rotates the inclined conveying coil 52 in the direction indicated by the arrow in FIG. 3 around a rotation center β with a rotational drive of the horizontal conveying coil 51 by a motor.

On the other hand, the horizontal conveyance passage 41 communicates with an upper end of the drop conveyance passage 43 and extends in a horizontal direction, that is, a direction from left to right in FIG. 3 (a direction from the positive side to the negative side of the x axis in FIG. 3). In other words, the horizontal conveyance passage 41 is disposed to intersect the drop conveyance passage 43 in the horizontal direction. In the present embodiment, the horizontal conveyance passage 41 is formed in a substantially cylindrical shape.

The horizontal conveyance passage 41 is internally provided with the horizontal conveying coil 51 as a coil-shaped conveyor (second conveyor) that rotates in a specified direction and conveys waste toner (toner) in the horizontal direction. With reference to FIG. 3, the horizontal conveying coil 51 serving as a second conveyor is made of a metal material. An upstream end (right end in FIG. 3) of a coil portion spirally wound in a specified direction is joined to a shaft of the horizontal conveying coil 51 by welding. The bevel gear 61 is disposed on the shaft of the horizontal conveying coil 51. The horizontal conveying coil 51 rotates in the direction indicated by the arrow in FIG. 3 around a rotation center α by being driven by a motor.

Figure 4:
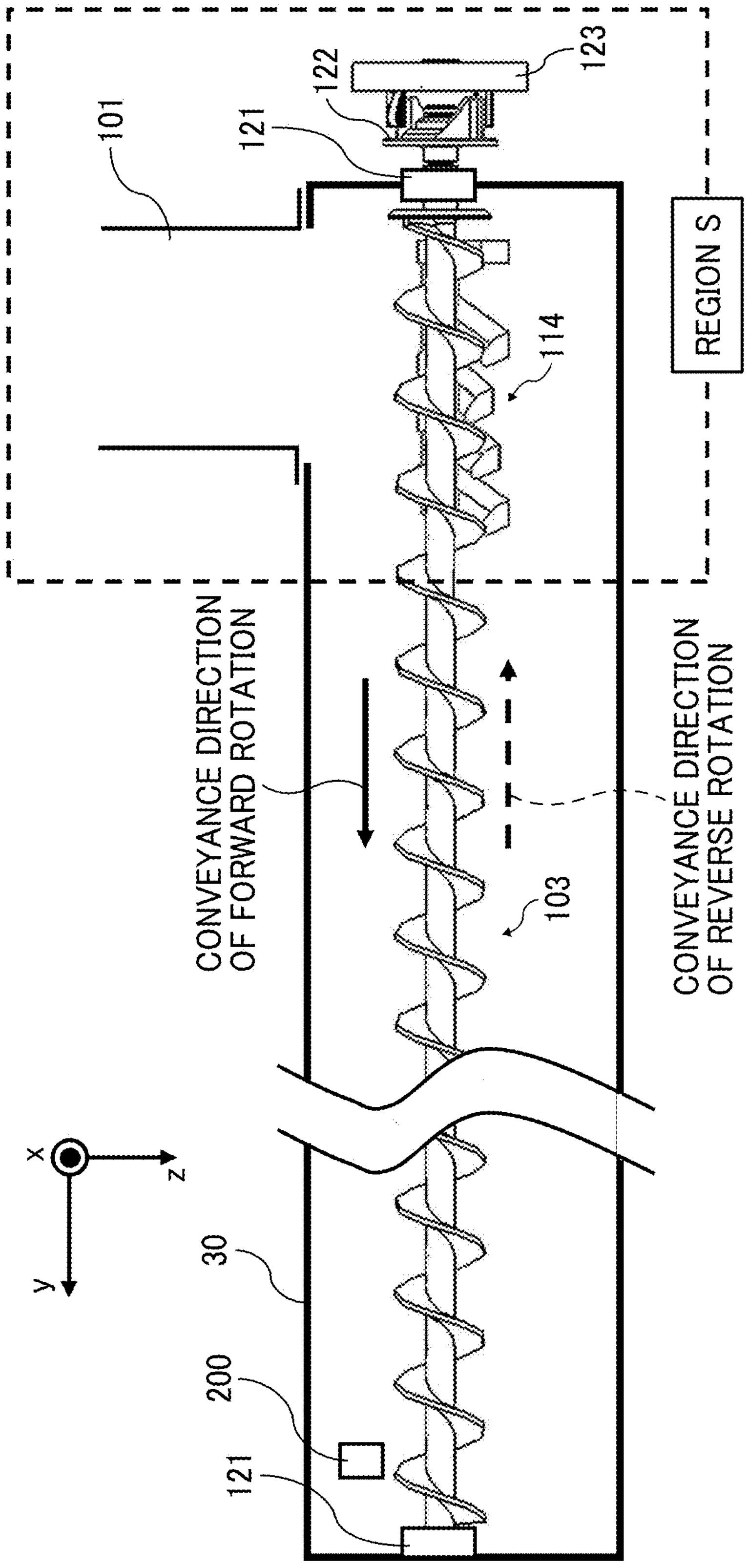
FIG. 4 is a view of a waste toner collection container.

With reference to FIG. 4, a description is given of the waste-toner collection container 30 according to the present embodiment in detail. Note that when FIG. 1 is the diagram illustrating the front side of the image forming apparatus 1, FIG. 4 is a diagram illustrating the waste-toner collection container 30 viewed from the right side (the positive side of the x axis of FIG. 1). FIG. 4 is a longitudinal cross-sectional view of the waste-toner collection container 30 installed in a body (a body of the image forming apparatus 1). The waste-toner collection container 30 includes a conveyor 103 (an example of a conveyor) therein. The conveyor 103, which is called a conveying screw, has a shaft 103*a* (an example of a shaft) serving as a rotation shaft around which a blade 103*b* (an example of a blade) is spirally wound, and rotates in a specified direction to convey powder such as waste toner. The conveyor 103 is held by a holder 121 such as a bearing and rotates to convey the waste toner to the left side in FIG. 4 (the positive side of the y axis in FIG. 4). At least one end of the conveyor 103 protrudes outward from the waste-toner collection container 30, and a joint 122 is assembled to the protruding end of the conveyor 103.

The waste-toner collection container 30 is inserted and set from left to right in FIG. 4 (from the positive side to the negative side of the y axis in FIG. 4), and at that time, a body-side joint 123 and the joint 122 mesh with each other to transmit a body-side drive to the conveyor 103. The toner (waste toner) ejected from the body drops through a waste-toner ejection port 101 (an example of a powder collection port), a swinging member 114 (an example of a swinging member) of the waste-toner collection container 30 disposed on the lower side (the positive side of the z axis in FIG. 4) of the waste-toner ejection port 101 swings with the rotation of the conveyor 103, so that the accumulation of waste toner and crosslinking accompanied by the swing is prevented. A description is given of details of the configuration of the swinging member 114 and the crosslinking later.

A full-state detection sensor 200 for detecting that the waste-toner collection container 30 is full of waste toner is disposed on the downstream side (the positive direction of the y axis in FIG. 4) in the conveyance direction in which the conveyor 103 rotates forward to convey toner. The full-state detection sensor 200 includes, for example, a member such as a feeler on a side face of the waste-toner collection container 30. The member is pushed outward (toward the negative side of the x axis in FIG. 4) by the waste toner accumulated in the container, and the movement of the member is detected to determine whether the container is full.

Figure 5A:
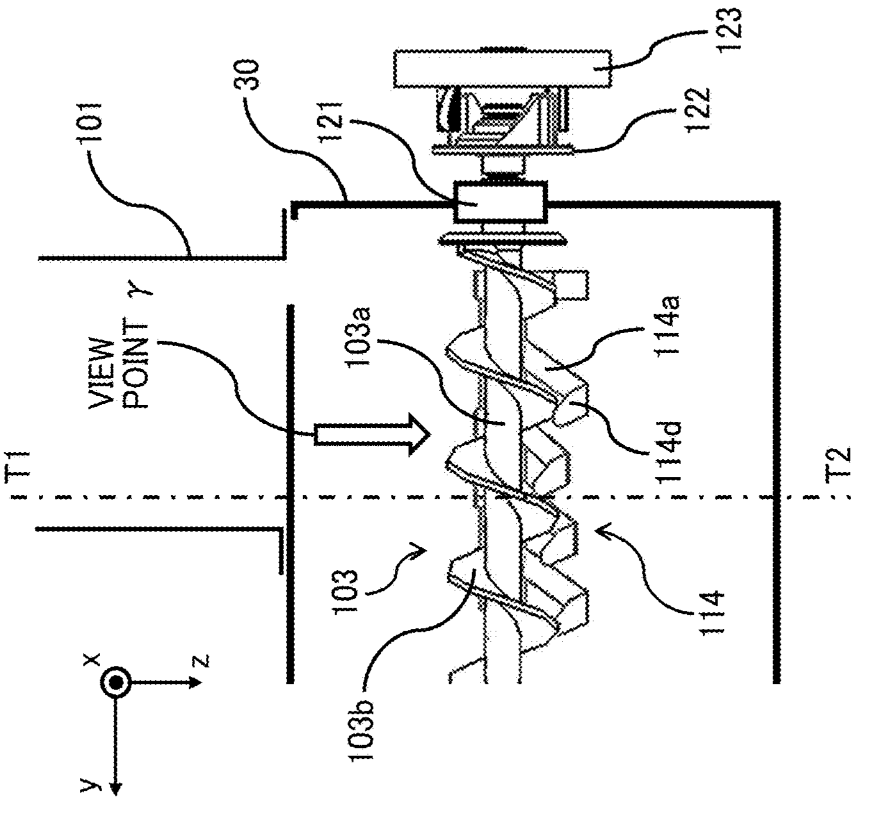
FIGS. 5A and 5B are views of a swinging member.
Figure 5B:
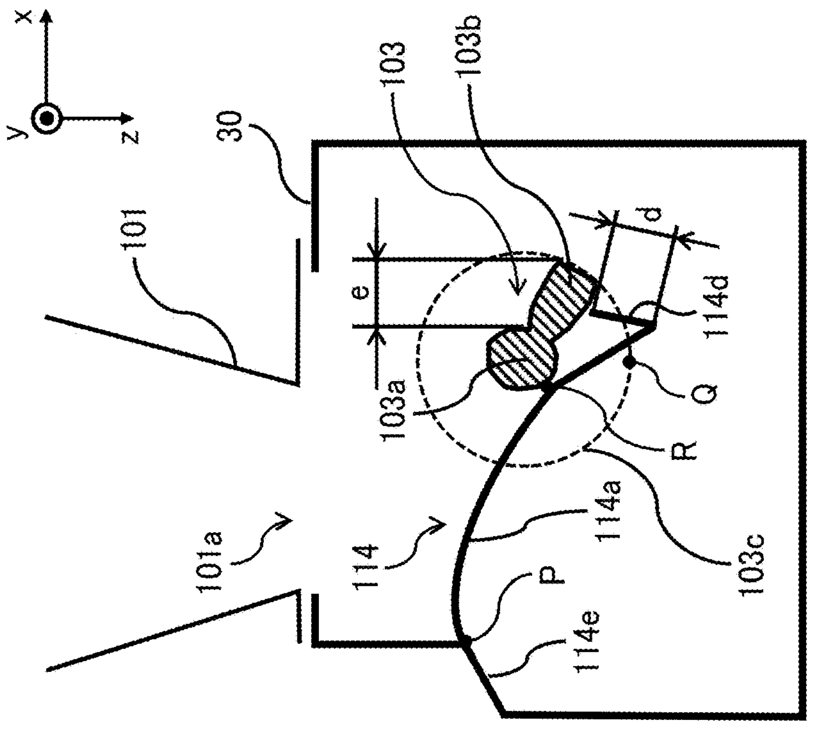

FIGS. 5A and 5B are diagrams illustrating the swinging member 114. FIG. 5A is a diagram focusing on a portion of a region S in FIG. 4, and FIG. 5B is a cross-sectional view of the waste-toner collection container 30 viewed from the positive side of the y axis on the T1-T2 line of FIG. 5A. A description is given of an outline of the configuration of the swinging member 114 with reference to FIGS. 5A and 5B. A detailed description is given of the swinging member 114 later.

As illustrated in FIG. 5A, in a region on the lower side (the positive side of the z axis in FIG. 5A) of the waste-toner ejection port 101, the swinging member 114 is disposed to be pressed against the conveyor 103 from the lower side to the upper side (from the negative side to the positive side of the z axis in FIG. 5A). The swinging member 114 swings along the blade 103*b* of the conveyor 103.

As illustrated in FIG. 5B, the swinging member 114 has a fixing portion 114*e* (an example of a fixing portion) that fixes the swinging member 114 inside the housing of the waste-toner collection container 30, and an overhang portion 114*a* (an example of an overhang portion) that is coupled to the fixing portion 114*e* and extends to branch from the fixing portion 114*e*. The swinging member 114 is cantilevered such that the fixing portion 114*e* is attached to the inner surface of the container with, for example, double-sided tape or adhesive. The overhang portion 114*a* has a bent portion 114*d* (an example of a bent portion) that is positioned on the free end and is formed by bending a tip portion of the overhang portion 114*a* inward. The bent portion 114*d* is bent toward the blade 103*b* and contacts an outer edge portion of the blade 103*b*. Since the bent portion 114*d* is provided, the tip of the bent portion 114*d* of the swinging member 114 always contacts the conveyor 103 before a middle portion of the swinging member 114 contacts, in the case where the conveyor 103 is erroneously rotated in a direction (reverse rotation) opposite to a direction (forward rotation) in which the conveyor 103 should originally be rotated. Such a configuration prevents the middle portion of the swinging member 114 from being caught by the blade 103*b* of the conveyor 103. The term "direction in which the conveyor should originally rotate (forward rotation)" as used herein refers to a direction in which the conveyor rotates to convey waste toner in an intended direction (in the present embodiment, toward the positive side of the y axis direction in FIG. 4).

Assuming that a distance (a bending amount) from a bent (a portion coupled to an inclined portion 114*c*) of the bent portion 114*d* to the tip of the bent portion 114*d* is d and one half of the "outer diameter of the blade (outer diameter of the blade 103*b*)—outer diameter of the shaft (outer diameter of the shaft 103*a*)" is e, d≈e (i.e., d and e are substantially equal to each other) is satisfied. The reason for this configuration is that if d is too large (too long) compared to e, the bent portion 114*d* contacts the shaft 103*a* first, and thus the swinging member 114 does not swing. On the other hand, if d is too small (too short) compared to e, the swinging member 114 is caught by the rotation of the conveyor 103. Accordingly, from the viewpoint of preventing the inconvenience, as described above, d≈e is satisfied. Note that in the present embodiment, d=6.8 mm and e=7.0 mm are satisfied.

The swinging member 114 is fixed such that the fixing portion 114*e* of the swinging member 114 is attached to an attachment portion P in the waste-toner collection container 30. At this time, the attachment portion P is located at a position higher than a lower end Q of a rotation locus 103*c* of the conveyor 103 (blade 103*b*). The overhang portion 114*a* of the swinging member 114 is disposed to contact or pass below the lower portion R of the shaft 103*a* of the conveyor 103.

Figure 6A:
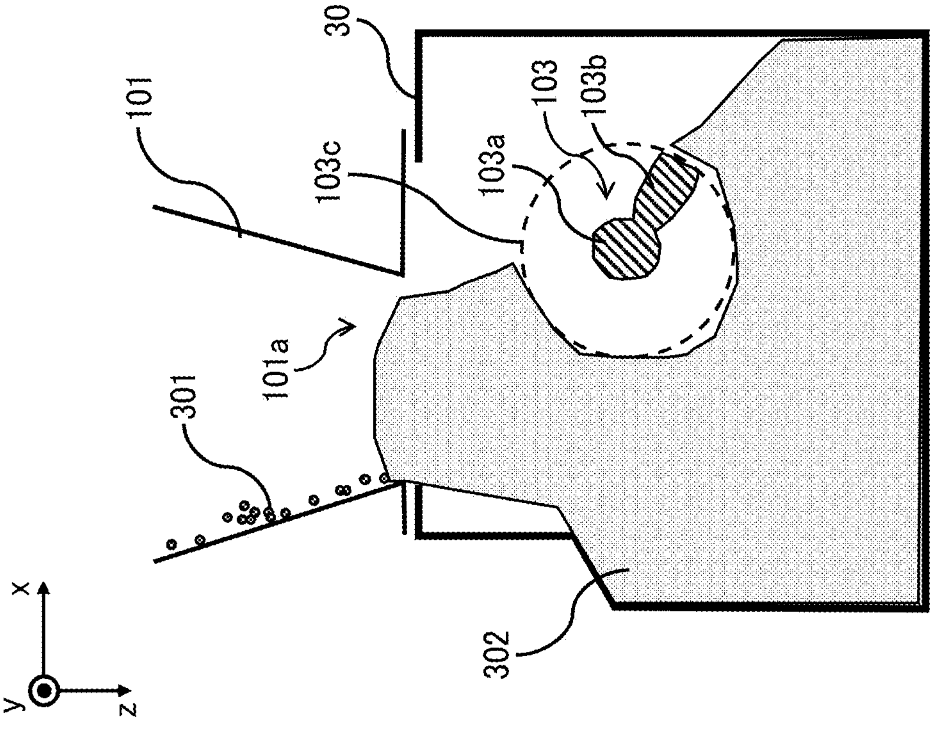
FIGS. 6A and 6B are diagrams illustrating a function of a swinging member.
Figure 6B:
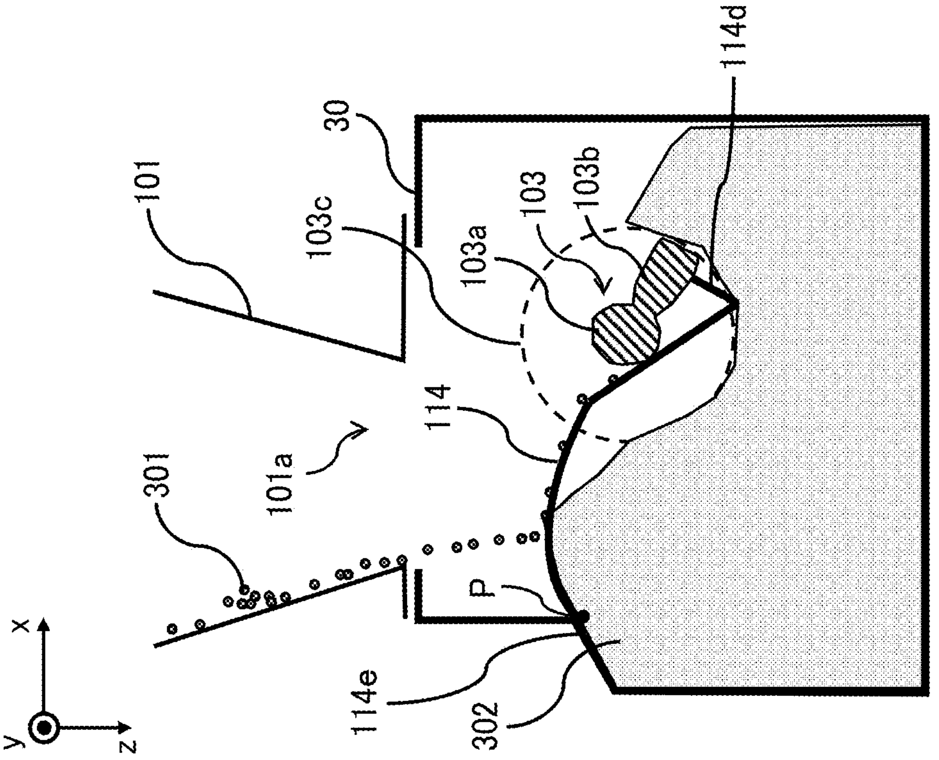

FIGS. 6A and 6B are diagrams illustrating a function of the swinging member 114. As with FIG. 5B, FIGS. 6A and 6B are cross-sectional views of the waste-toner collection container 30 viewed from the positive side of the y axis along the line T1-T2 of FIG. 5A. FIG. 6A illustrates a case where the waste-toner collection container 30 is not provided with the swinging member 114, and FIG. 6B illustrates a case where the waste-toner collection container 30 is provided with the swinging member 114.

First, a description is given of FIG. 6A. The waste-toner collection container 30 is provided with the waste-toner ejection port 101 that receives waste toner. In order to convey waste toner 301, typically, it is desirable that the conveyor (conveying screw) 103 is provided immediately below an opening portion 101*a* (an example of an opening portion) of the waste-toner ejection port 101. On the other hand, the conveyor 103 according to the present embodiment is not located on the lower side (the positive side of the z axis) of the opening portion 101*a* of the waste-toner ejection port 101 but is located at a position shifted from the opening portion 101*a* due to the layout of the opening portion 101*a* with other devices. Accordingly, when such a layout is adopted, the waste toner 301 is not appropriately conveyed by the conveyor 103. As illustrated in FIG. 6A, the waste toner 301 accumulates in the vicinity of the opening portion 101*a*, and thus eventually blocks the opening portion 101*a*.

For this reason, as illustrated in FIG. 6B, the waste-toner collection container 30 according to the present embodiment is provided with the swinging member 114 to move the waste toner 301 falling from the opening portion 101*a* toward the conveyor 103. In addition, as to be described below in detail, the swinging member 114 has a substantially comb-shape, so that the waste toner 301 gradually accumulates also below the swinging member 114. The swinging member 114 swings the accumulated waste toner 302 so that the waste toner 302 is also moved toward the conveyor 103. The swinging member 114 repeatedly contacts the shaft 103*a* and the blade 103*b* by the rotation of the conveyor 103 to swing. With such a configuration, the accumulated waste toner 302 described above is broken and moved toward the conveyor 103. In addition, the waste toner accumulated on the swinging member 114 is shaken not to be crosslinked.

Note that the term "crosslinking" as used herein means, for example, a state in which waste toner accumulates to bridge from the opening portion to the conveyor, or a state in which the waste toner accumulates on the swinging member and bridges from the opening portion to the conveyor with the waste toner.

The swinging member 114 is preferable to be long enough for the bent portion 114*d* of the swinging member 114 to contact the tip portion of the blade 103*b* of the conveyor 103. Accordingly, if the swinging member 114 is too short, the swinging member 114 does not contact the blade 103*b*, and thus the effect cannot be exerted. In contrast, if the swinging member 114 is too long, the swinging member 114 is buried in the accumulated waste toner 302. Accordingly, for example, the length of the swinging member 114 is preferably a length from the attachment portion P to the tip portion of the blade 103*b*.

Figure 7A:
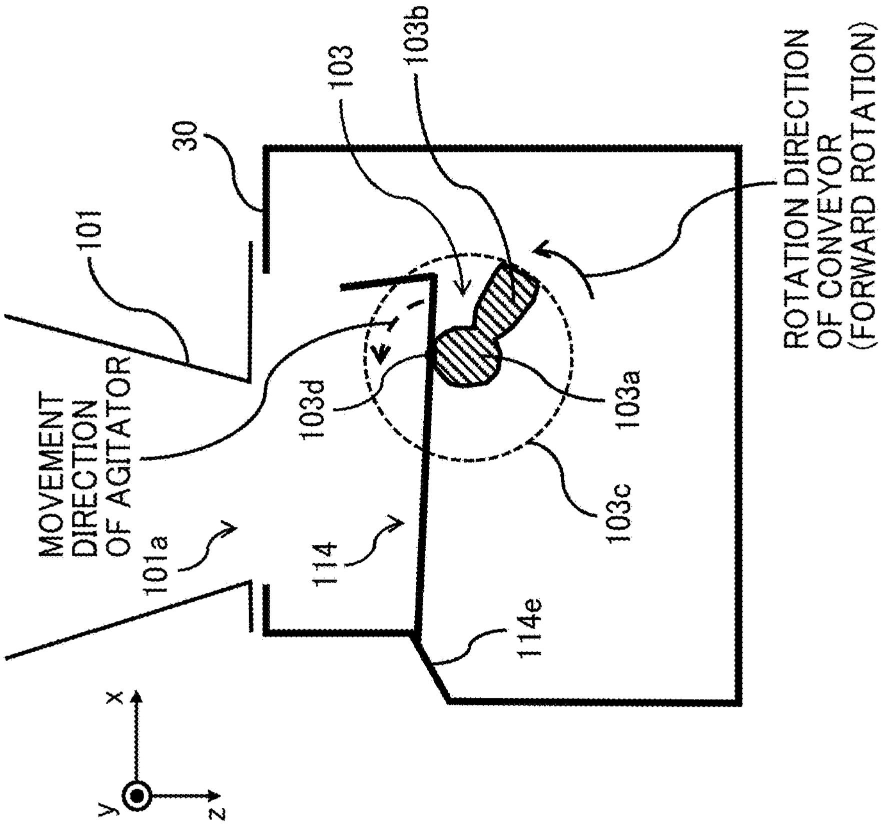
FIGS. 7A and 7B are diagrams each illustrating an arrangement of a swinging member.
Figure 7B:
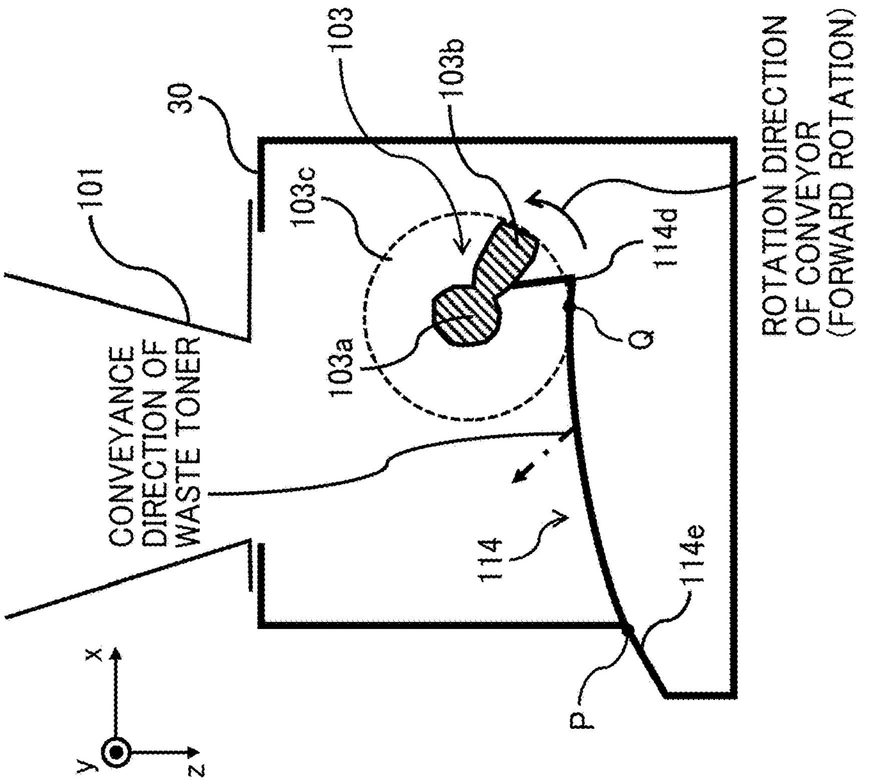

FIGS. 7A and 7B are diagrams each illustrating an arrangement of the swinging member 114. FIG. 7A is a diagram illustrating an inconvenience occurring when the swinging member 114 is disposed at a higher position than the conveyor 103 in the waste-toner collection container 30. FIG. 7B is a diagram illustrating an inconvenience occurring due to a positional relation between the swinging member 114 and the conveyor 103 in the waste-toner collection container 30.

First, a description is given of FIG. 7A below. FIG. 7A illustrates a configuration in which the swinging member 114 is disposed to contact the conveyor 103 at a contact portion 103*d* of the upper portion of the shaft 103*a* of the conveyor 103. With such a configuration, it can be said that the swinging member 114 is disposed to bridge the contact portion 103*d* and the fixing portion 114*e*. At this time, the bent portion 114*d* of the swinging member 114 is not directed toward the blade 103*b*, and the tip of the bent portion 114*d* does not contact the blade 103*b*.

With such a configuration, the opening portion 101*a* of the waste-toner ejection port 101 is positioned at an upper portion of the swinging member 114 (on the negative side of the z axis in FIG. 7A). In the present embodiment, as illustrated in FIG. 7A, the counterclockwise direction of the conveyor 103 is the forward rotation direction, and the conveyor 103 conveys waste toner in the forward rotation direction. In such a case, the following inconvenience occurs.

The waste toner is conveyed to the waste-toner collection container 30 via the waste-toner ejection port 101, and the conveyed waste toner drops on the swinging member 114 disposed to bridge as described above. At this time, the swinging member 114 contacts the rotating conveyor 103 and rotates toward the opening portion 101*a* as indicated by a dashed arrow in FIG. 7A. Then, the swinging member 114 conveys the waste toner conveyed thereon to a side opposite to the side on which the conveyor 103 of the waste-toner collection container 30 is disposed (the left side in FIG. 7A, and the negative side of the x axis). As a result, the waste toner is likely to be accumulated in the vicinity of the opening portion 101*a*.

When the conveyor 103 is disposed to bridge as described above, waste toner is likely to accumulate (pool) on the swinging member 114, which results in the above-described crosslinking.

For this reason, from the viewpoint of preventing the above-described inconvenience, the swinging member 114 according to the present embodiment is, as illustrated in FIG. 5B, disposed to contact or pass below the lower portion R of the shaft 103*a* of the conveyor 103.

Next, a description is given of FIG. 7B below. FIG. 7B illustrates a case where an attachment portion P to which the fixing portion 114*e* of the swinging member 114 is attached in the waste-toner collection container 30 is positioned at a position lower than the lower end Q of the rotation locus 103*c* of the conveyor 103 (the blade 103*b*). Note that the bent portion 114*d* of the swinging member 114 is directed toward the blade 103*b*, and the tip of the bent portion 114*d* is in contact with the blade 103*b*.

In this case, the waste toner is conveyed to the waste-toner collection container 30 via the waste-toner ejection port 101, and the conveyed waste toner drops on the swinging member 114. At this time, the swinging member 114 contacts the rotating conveyor 103, and the swinging member 114 starts moving. As indicated by an arrow of a dashed line in FIG. 7B, this movement causes the swinging member 114 to convey the conveyed waste toner to a side opposite to the side on which the conveyor 103 of the waste-toner collection container 30 is disposed (the left side in FIG. 7B, and the negative side of the x axis). As a result, the waste toner is likely to be accumulated in the vicinity of the opening portion 101*a*.

For this reason, from the viewpoint of preventing such an inconvenience, as illustrated in FIG. 5B, the swinging member 114 according to the present embodiment is disposed such that the attachment portion P in the waste-toner collection container 30 is positioned at a position higher than the lower end Q of the rotation locus 103*c* of the conveyor 103 (the blade 103*b*).

Figure 8B:
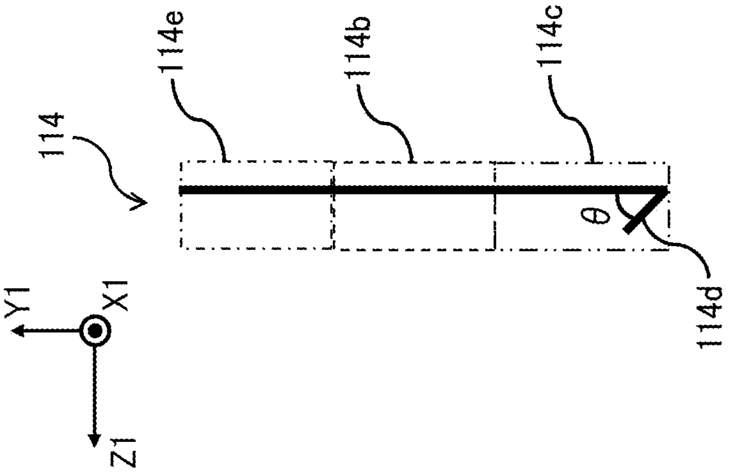
FIGS. 8A and 8B are diagrams illustrating details of a configuration of a swinging member.
Figure 8A:
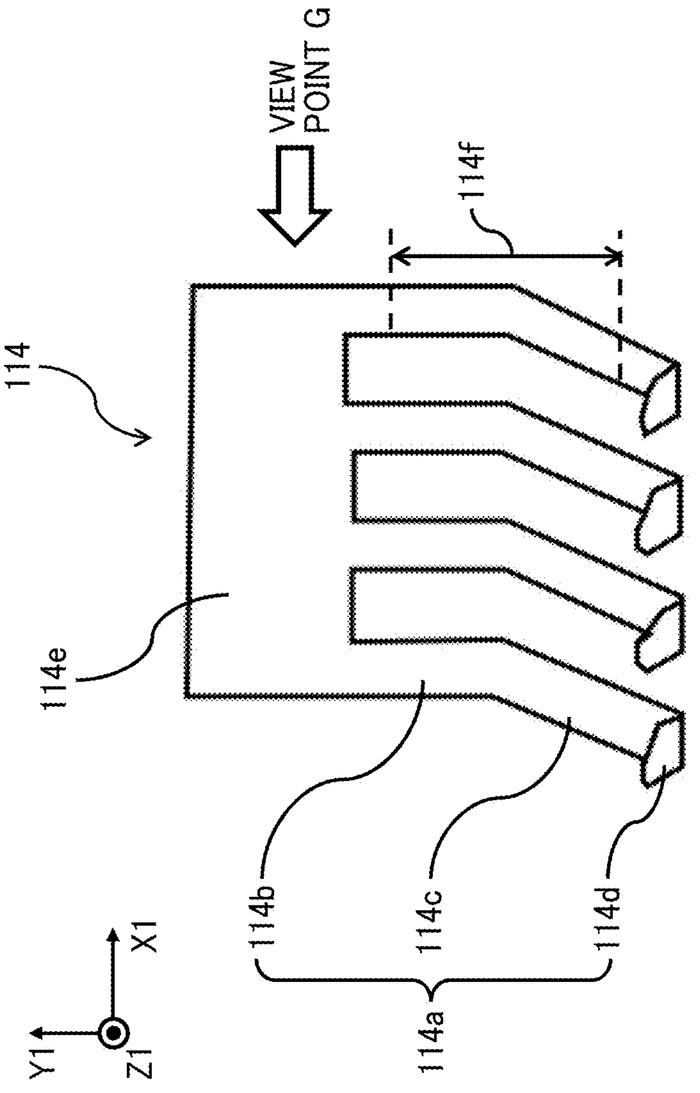

FIGS. 8A and 8B are diagrams illustrating details of the configuration of the swinging member 114. FIG. 8A is a diagram illustrating the entire configuration of the swinging member 114, and FIG. 8B illustrates the configuration when viewed from the direction of the viewpoint G in FIG. 8A (the positive direction of X1 axis in FIG. 8A). A description is given of the details of the swinging member 114 according to the present embodiment with reference to FIGS. 8A and 8B. The following description focuses on the configuration of the swinging member 114. For the convenience of explanation, the definition of the coordinates illustrated in FIGS. 8A and 8B is different from the previous definition of the coordinates.

First, as illustrated in FIG. 8A, the swinging member 114 has a substantially comb shape. Accordingly, the accumulation of the waste toner on the conveyor in the waste-toner collection container can be prevented. The swinging member 114 includes a fixing portion 114*e* and overhang portions 114*a*. The fixing portion 114*e* fixes the swinging member

114 inside the housing of the waste-toner collection container 30. The overhang portions 114*a* are connected to the fixing portion 114*e* and extend to branch from the fixing portion 114*e*. The overhang portions 114*a* are formed in parallel at intervals in the axial direction of the conveyor 103. The overhang portion 114*a* has a free end and contacts the conveyor 103 that is a screw.

As illustrated in FIG. 8B, the swinging member 114 is a flexible sheet-like member made of, for example, polyethylene terephthalate (PET). The swinging member 114 is about 0.05 to 0.2 mm thick and is swingable between the shaft 103*a* and the blade 103*b* along with rotation of the conveyor 103.

As illustrated in FIG. 8A, the overhang portion 114*a* has a connecting portion 114*b*, an inclined portion 114*c*, and a bent portion 114*d*. The connecting portion 114*b* is connected to the fixing portion 114*e*. The inclined portion 114*c* is connected to the connecting portion 114*b* and is inclined at a specified angle with respect to the connecting portion 114*b*. The bent portion 114*d* is connected to the inclined portion 114*c*, is positioned on the free end of the overhang portion 114*a*, and is formed by bending the tip of the overhang portion 114*a*. In FIG. 8B, the fixing portion 114*e* is a part surrounded by a dashed line, the connecting portion 114*b* is a part surrounded by a broken line, the inclined portion 114*c* is a part surrounded by a two-dot chain line, and the bent portion 114*d* is a part bent at an angle θ from the inclined portion 114*c*. In addition, a part corresponding to about one third to two third of the total length of the overhang portion 114*a* is a middle portion 114*f*. The middle portion 114*f* has a shaft contact portion. A part of the shaft contact portion contacts the lower portion R of the shaft 103*a* of the conveyor 103.

The bent portion 114*d* prevents the swinging member 114 from being caught by the rotating blade 103*b* even if a user erroneously rotates the conveyor 103 in reverse. A description is given later of details of the function of the bent portion 114*d* achieved when the conveyor 103 rotates in reverse. As illustrated in FIG. 8B, an angle θ formed by the bent portion 114*d* and the inclined portion 114*c* is set to about 40° to 60° in order to achieve the above-described function.

The inclined portion 114*c* (an example of an inclined portion) is inclined at a specified angle in the negative direction (leftward direction) of the X1 axis in FIG. 8A with respect to the connecting portion 114*b*. The inclined portion 114*c* is not inclined relative to the connecting portion 114*b* in the negative direction of Z1 axis in FIG. 8A (the direction toward the plane on which FIG. 8A is illustrated). The swinging member 114 according to the present embodiment is provided with the inclined portion 114*c* in the swinging member 114 in addition to the bent portion 114*d*, so that the effect of preventing the swinging member 114 from being caught by the rotation of the conveyor 103 can be increased.

Figure 9:
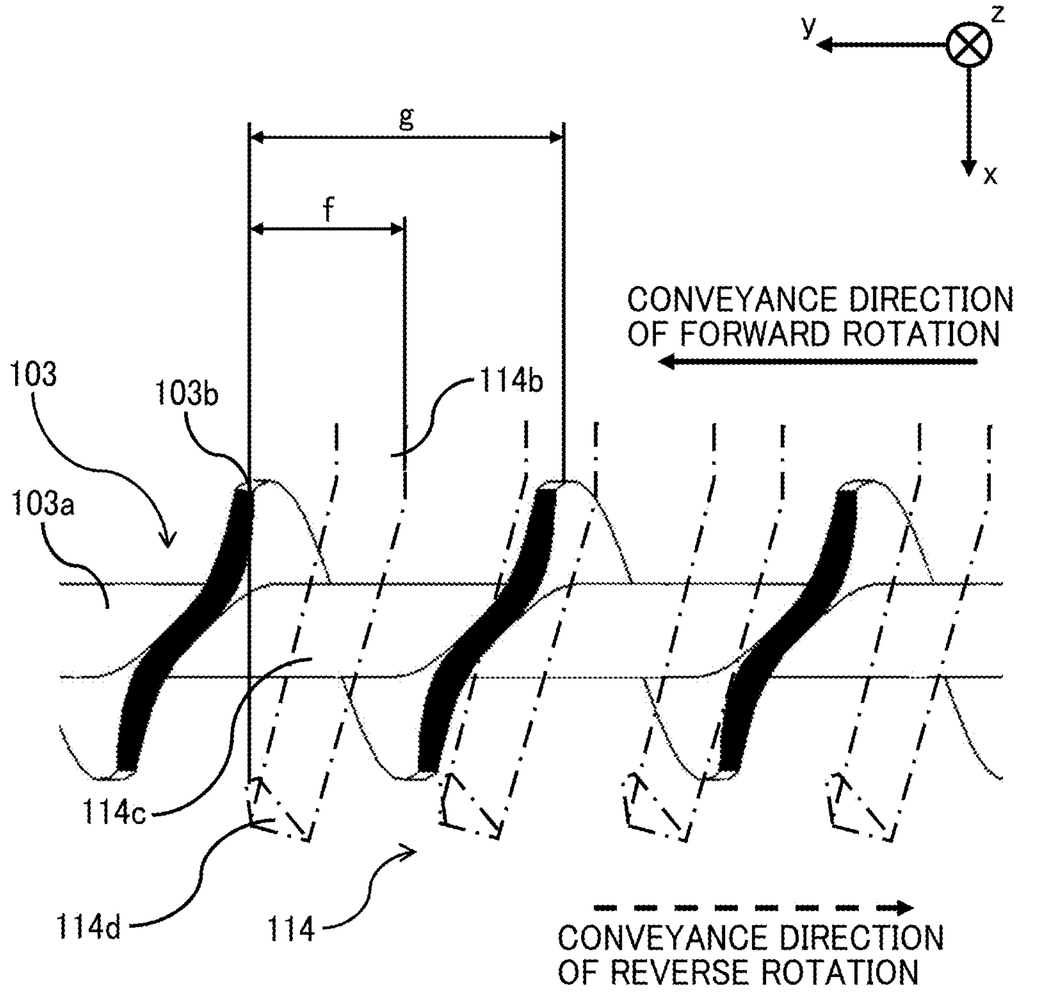
FIG. 9 is a diagram illustrating contact between a swinging member and a conveyor.

FIG. 9 is a diagram illustrating the contact of the swinging member 114 and the conveyor 103. FIG. 9 illustrates the swinging member 114 viewed from the direction of a viewpoint γ in FIG. 5A (the direction from the negative side to the positive side of the z axis in FIG. 5A). With reference to FIG. 9, a description is given of functions of the bent portion 114*d* and the inclined portion 114*c* when the swinging member 114 contacts the conveyor 103. The definitions of the coordinates in FIG. 9 and subsequent drawings are the same as those illustrated in the drawings other than FIGS. 8A and 8B. The swinging member 114 is illustrated in FIG. 9 as an initial position and is indicated by a dashed line in order to describe the positional relation with the conveyor 103.

In FIG. 9, the positive direction of the y axis corresponds to a conveyance direction in which the waste toner is conveyed when the conveyor 103 rotates forward, and the negative direction of the y axis corresponds to a conveyance direction in which the waste toner is conveyed when the conveyor 103 rotates in reverse. It is assumed that the conveyor 103 is rotated in reverse. It can be seen that the inclined portion 114*c* of the swinging member 114 is inclined to face the conveyance direction in which toner is conveyed when the conveyor 103 rotates forward. Such a configuration can prevent buckling that occurs when the swinging member 114 contacts, for example, the blade 103*b* of the conveyor 103.

According to the configuration described above, the bent portion 114*d* of the swinging member 114 contacts the conveyor 103, so that the middle portion 114*f* of the swinging member 114 retracts (moves away from the conveyor 103) before the middle portion 114*f* contacts the conveyor 103.

With such a configuration, even if the conveyor 103 is rotated in reverse, the swinging member 114 can be prevented from being caught by the conveyor 103.

Assuming that the width of the inclined portion 114*c* in the conveyance direction when the swinging member 114 inclines is f and the pitch of the blade 103*b* of the conveyor 103 is g, the relation between f and g desirably satisfies f/g=½ to 1. If the pitch is too large, the swinging member 114 contacts the blade 103*b* before the swinging member 114 contacts the shaft 103*a* and thus the swinging member 114 does not swing, which is not preferable. On the other hand, if the pitch is too small, the inclination angle is not appropriately formed and the swinging member 114 is caught by the rotation of the conveyor 103, and thus the effect of preventing the swinging member 114 from being caught cannot be sufficiently performed.

Accordingly, on the basis of these reasons, the relation between f and g is set to satisfy f/g=½ to 1 as described above. In the present embodiment, f is about 6 mm and g is about 10 mm.

Figure 10C:
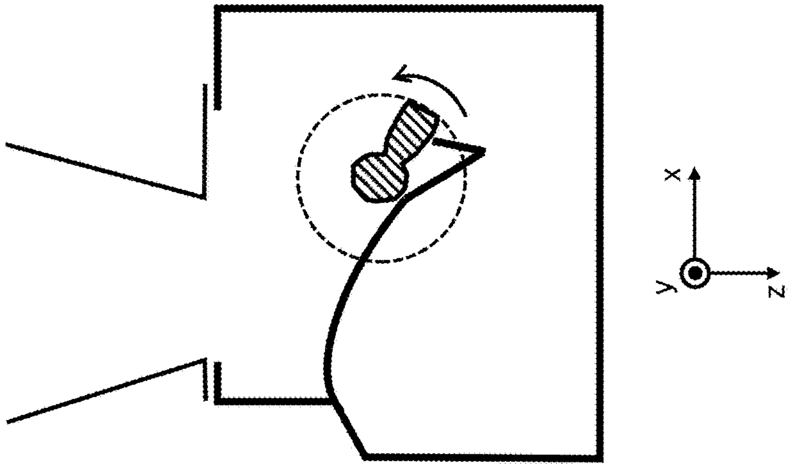
FIGS. 10A, 10B, and 10C are diagrams illustrating an operation of a swinging member.
Figure 10B:
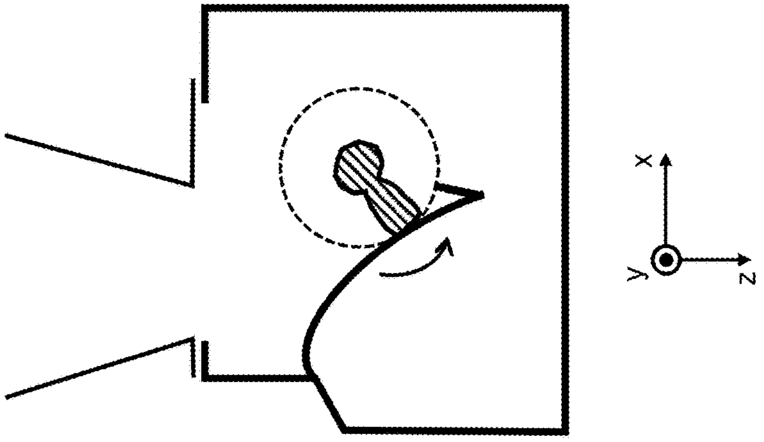
Figure 10A:
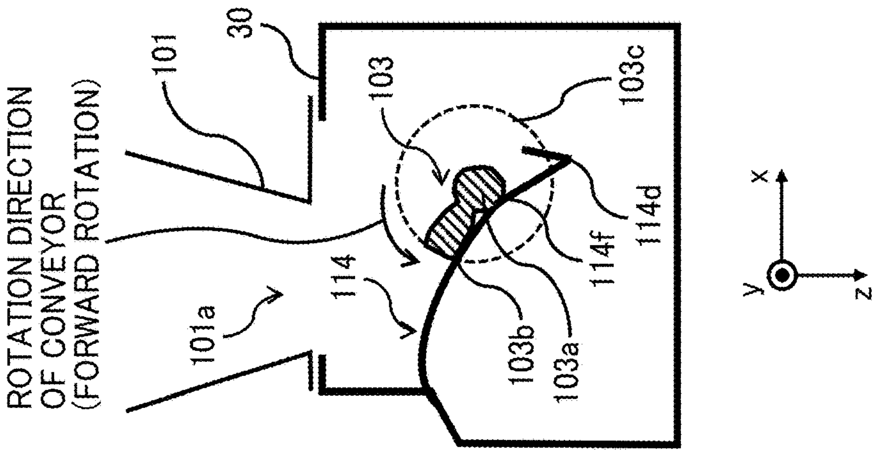

FIGS. 10A, 10B, and 10C are diagrams illustrating operation of the swinging member according to the present embodiment. With reference to FIGS. 10A, 10B, and 10C, a description is given of a movement of the swinging member 114 when the conveyor 103 is rotated (rotated forward). Note that the "rotated forward" or "forward rotation" referred to here is as described above. As illustrated in FIGS. 10A, 10B, and 10C, the conveyor 103 rotates in a counterclockwise direction, that is, the forward rotation direction of the conveyor 103. The configuration of components is the same except the rotation operation in FIGS. 10A, 10B, and 10C. The reference signs are illustrated in only FIG. 10A and are omitted in FIGS. 10B and 10C.

As illustrated in FIG. 10A, in the waste-toner collection container 30 according to the present embodiment, the opening portion 101*a* of the waste-toner ejection port 101 is disposed at a position that is not on the upper portion (the negative side of the z axis in FIG. 10A) of the conveyor (conveying screw) 103 due to the relation with other components. Due to such an arrangement relation, the waste-toner collection container 30 according to the present embodiment causes the swinging member 114 to move the waste toner falling from the opening portion 101*a* toward the conveyor 103 (the positive side of the x axis in FIG. 10A).

The swinging member 114 according to the present embodiment has a substantially comb shape as described above, so that waste toner gradually accumulates also on the lower portion of the swinging member 114 (the positive side of the z axis in FIG. 10A). The accumulated waste toner is also moved toward the conveyor 103 by the swinging of the swinging member 114. The swinging member 114 swings such that the shaft 103*a* and the blade 103*b* repeatedly contact with each other by the rotation of the conveyor 103. With this configuration, the accumulated waste toner is broken up and moved toward the conveyor 103, and the waste toner accumulated on the swinging member 114 is shaken off not to be crosslinked.

A description is given of a rotation operation of the conveyor 103. FIG. 10A illustrates the initial position of the swinging member 114 when the conveyor 103 starts to rotate (rotate forward). The swinging member 114 starts to contact the conveyor 103, and at this time, the middle portion 114*f* of the swinging member 114 starts to contact the blade 103*b* of the conveyor 103. As illustrated in FIG. 10B, the conveyor 103 rotates, so that the swinging member 114 deforms and follows the conveyor 103.

When the conveyor 103 rotates and becomes the state illustrated in FIG. 10C, the bent portion 114*d* of the overhang portion 114*a* of the swinging member 114 contacts the blade 103*b*. As the conveyor 103 continues to rotate, the state illustrated in FIG. 10C returns to the state illustrated in FIG. 10A afterwards. Also at this time, the waste toner is conveyed by the conveyor 103 toward the further back side (the right side in FIG. 10A, and the positive side of the x axis in FIG. 10A) of the waste-toner collection container 30, and thus the swinging member 114 also contacts the conveyor 103 and performs the above-described function.

The swinging member 114 according to the present embodiment has the bent portion 114*d* and the inclined portion 114*c* as described above. A description is given below on how these components function in comparison with the configurations according to comparative examples.

Figure 11A:
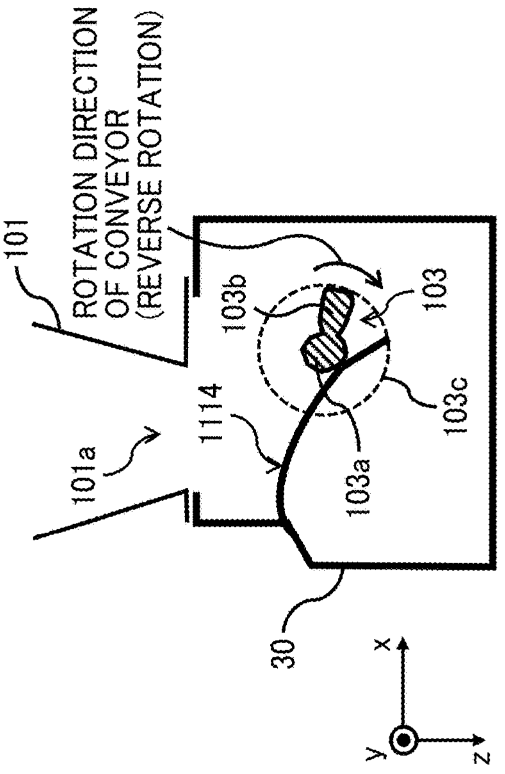
FIGS. 11A, 11B, 11C, and 11D are diagrams illustrating the operation of a swinging member according to a comparative example during reverse rotation of a conveyor.
Figure 11B:
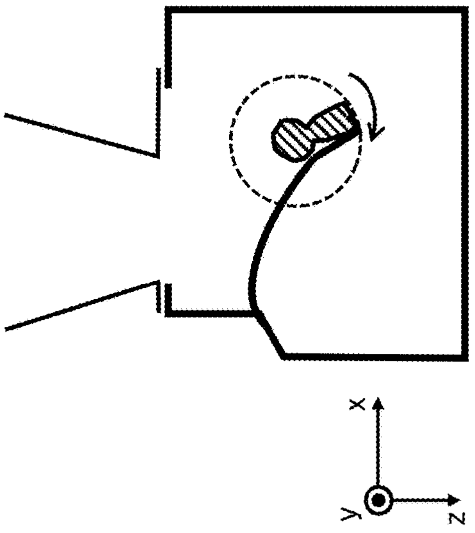

FIGS. 11A, 11B, 11C, and 11D are diagrams illustrating an operation of a swinging member 1114 according to a comparative example when a conveyor rotates in reverse. Unlike the swinging member 114 according to the present embodiment, the swinging member 1114 according to the comparative example has a configuration in which a bent portion is not formed at the tip portion located on a free end of the overhang portion. With reference to FIG. 11A, a description is given of an inconvenience that occurs when a conveyor rotates in reverse in a case where a swinging member according to a comparative example is used. The configuration of components is the same except the rotation operation in FIGS. 11A, 11B, 11C, and 11D. The reference signs are illustrated in only FIG. 11A and are omitted in FIGS. 11B, 11C, and 11D.

First, a user may replace only the inside of the waste-toner collection container 30 and use the container again. However, in this case, the user takes out the container from the body of the image forming apparatus 1. When the waste toner accumulated in the removed container is taken out for disposal, the user may manually rotate a gear coupled to the conveyor 103. At that time, the user may erroneously rotate the conveyor 103 in reverse.

This reverse rotation of the conveyor 103 results in rotation in a clockwise direction as illustrated in FIGS. 11A to 11D. FIG. 11A illustrates the initial position of the swinging member 1114 when the conveyor 103 starts to rotate in reverse. At this time, the swinging member 1114 is pressed against the conveyor 103. When the conveyor 103 rotates and becomes the state illustrated in FIG. 11B, a middle portion of an overhang portion of the swinging member 1114 contacts the blade 103*b*.

Figure 11C:
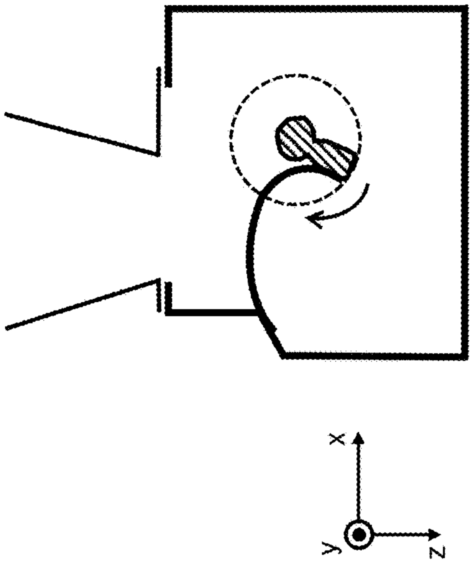
Figure 11D:
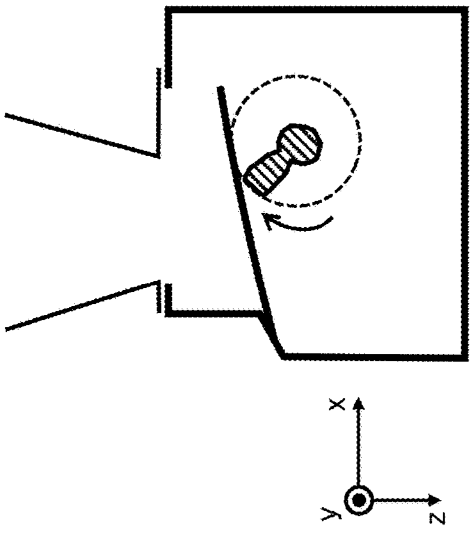

When the conveyor 103 further rotates and becomes the state illustrated in FIG. 11C, the swinging member 1114 bends and the middle portion of the overhang portion of the swinging member 1114 is wound inside the blade 103*b*. When the conveyor 103 continues to rotate and the swinging member 1114 becomes a state as illustrated in FIG. 11D, the bent swing member 1114 extends to jump over the upper portion (the negative side of the z axis in FIG. 11D) of the conveyor 103 by an elastic force. In such a case, the swinging member 1114 does not return to a specified position.

The opening portion 101*a* of the waste-toner ejection port 101 is not disposed above the conveyor 103, is positioned above the swinging member 1114, and is disposed at a position shifted from the swinging member 1114. Accordingly, the swinging member 1114 is disposed to extend from an area below the opening portion 101*a* to the conveyor 103 in order to contact the swinging member 1114 against the conveyor 103. On the other hand, as such a configuration is adopted, when the swinging member 1114 is brought into the state illustrated in FIG. 11D, the swinging member 1114 bridges one side on which the opening portion 101*a* is disposed in the waste-toner collection container 30 and the other side on which the conveyor 103 is disposed in the waste-toner collection container 30. The one side is the negative side of the z axis in FIGS. 11A to 11D, and the other side is the positive side of the z axis in FIGS. 11A to 11D. In the state in which the swinging member 1114 bridges, the waste toner 301 accumulates on the swinging member 1114, which leads to the occurrence of a phenomenon called crosslinking of waste toner.

Figure 12:
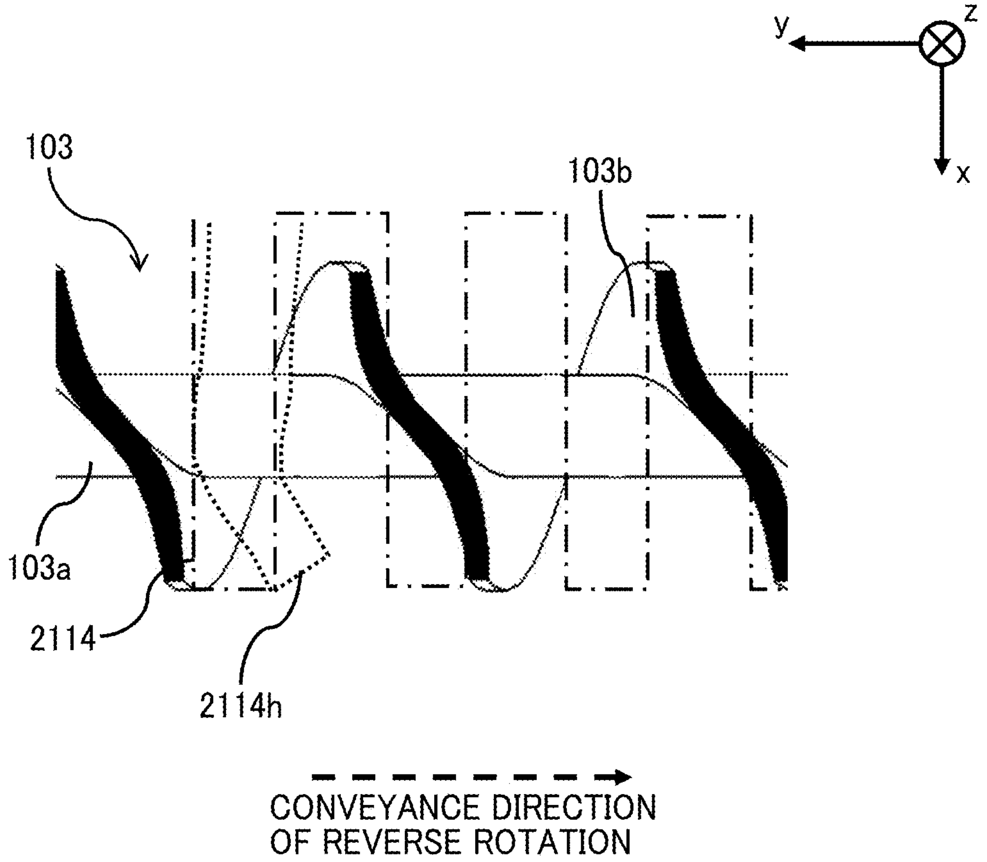
FIG. 12 is a diagram illustrating another problem of a swinging member according to a comparative example.

FIG. 12 is a diagram illustrating another inconvenience of a swinging member according to a comparative example. FIG. 12 illustrates a swinging member according to a comparative example as viewed from the direction of the viewpoint γ in FIG. 5A (the direction from the negative side to the positive side of the z axis in FIG. 5A). A swinging member 2114 according to the comparative example is different from the swinging member 114 according to the present embodiment in a configuration in which neither an inclined portion nor a bent portion is formed in the overhang portion. With reference to FIG. 12, a description is given of an inconvenience that occurs when the conveyor rotates in reverse in a case where the swinging member according to the comparative example is used. FIG. 12 illustrates the contact between the conveyor 103 and the swinging member 2114. The initial position of the swinging member 2114 is indicated by a dashed line. The state of the swinging member 2114 when the conveyor 103 is rotated in reverse by about ⅓ pitches from the initial position is indicated by a broken line. The negative direction of the y axis is the direction in which waste toner is conveyed when the conveyor 103 is rotated in reverse. FIG. 12 illustrates a state in which the conveyor 103 is rotated from the initial position.

In the above-described case, as illustrated in FIG. 12, when a tip portion of the swinging member 2114 is pressed by rotation of the conveyor 103, a middle portion of the swinging member 2114 is caught by the conveyor 103 in the conveyance direction in which toner is conveyed by the reverse rotation of the conveyor 103 and buckles. The buckled swinging member 2114 becomes like a swinging member 2114*h*. The buckling may occur because the swinging member 2114 is not provided with an inclined portion.

The occurrence of this buckling may lead to the extending of the swinging member as illustrated in FIG. 11D to jump over the conveyor.

For this reason, the swinging member according to the present embodiment has been provided with the bent portion and the inclined portion as described above to solve an inconvenience described above. FIGS. 13A to 13D are diagrams illustrating an operation of the swinging member according to the present embodiment when the conveyor is rotated in reverse. With reference to FIGS. 13A to 13D, a description is given of the movement of the swinging member 114 when the conveyor is rotated in reverse. The reverse rotation of the conveyor 103 is rotation in a clockwise direction as illustrated in FIGS. 13A to 13D. The configuration of components is the same except the rotation operation in FIGS. 13A, 13B, 13C, and 13D. The reference signs are illustrated in only FIG. 13A and are omitted in FIGS. 13B, 13C, and 13D.

Figure 13A:
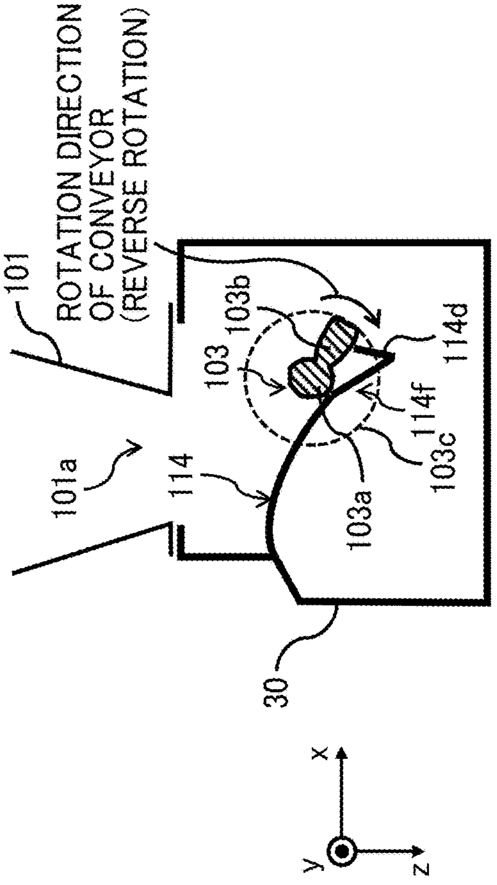
FIGS. 13A, 13B, 13C, and 13D are diagrams illustrating an operation of a swinging member during reverse rotation of the conveyor.

FIG. 13A illustrates an initial position of the swinging member when the conveyor 103 starts to rotate in reverse. The bent portion 114*d* is disposed at the tip portion of an overhang portion 114*a* of the swinging member 114, is bent toward the blade 103*b*, and contacts the blade 103*b*. The conveyor 103 rotates and, in the state illustrated in FIG. 13B, the bent portion 114*d* (tip portion) contacts the tip portion of the blade 103*b* of the conveyor 103. On the other hand, the conveyor 103 does not contact the middle portion 114*f* of the swinging member 114 at this time.

Figure 13B:
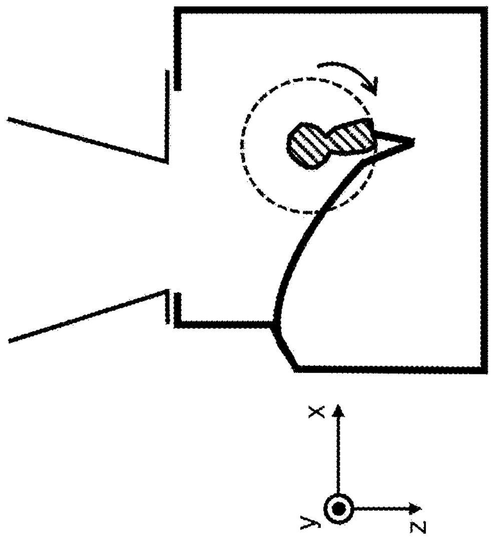
Figure 13C:
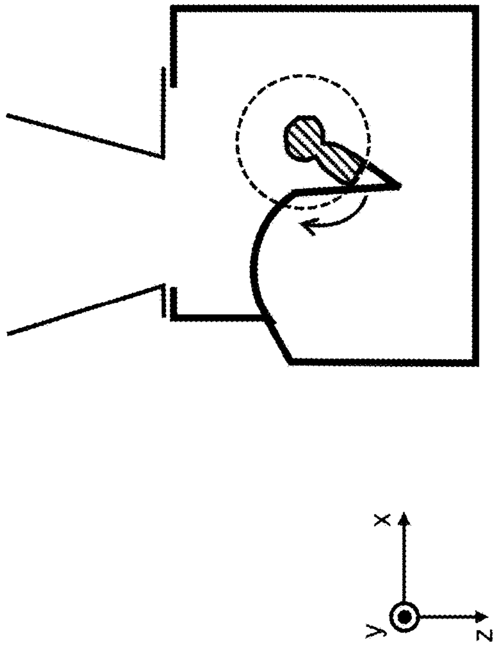
Figure 13D:
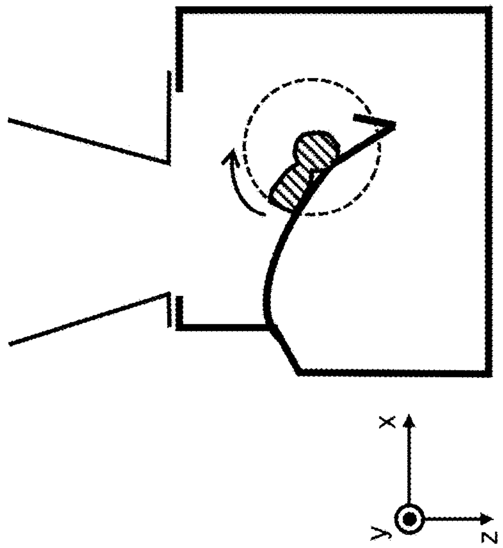

The conveyor 103 rotates and the swinging member 114 bends. In a state illustrated in FIG. 13C, the blade 103*b* contacts the middle portion 114*f*. As the conveyor 103 continues to rotate, the overhang portion 114*a* of the bent swinging member 114 elastically expands toward the side on which the conveyor 103 is positioned, as illustrated in FIG. 13D. At this time, the overhang portion 114*a* extends to pass the lower side (the positive side of the z axis in FIG. 13D) of the shaft 103*a* of the conveyor 103. As the conveyor 103 continues to rotate in reverse, the swinging member 114 returns to the state illustrated in FIG. 13A again, and the operations illustrated in FIGS. 13B to 13D are repeated.

As described above, the swinging member 114 according to the present embodiment is provided with the bent portion 114*d* at the tip portion of the overhang portion 114*a*. When the conveyor 103 rotates in reverse, the bent portion 114*d* contacts the blade 103*b* (the tip portion of the blade 103*b*) of the conveyor 103, so that the overhang portion 114*a* of the swinging member 114 is bent in a direction away from the shaft 103*a* (the negative direction of the x axis in FIG. 13). Thereafter, the tip portion of the blade 103*b* contacts the middle portion 114*f*. In other words, the bent portion 114*d* of the swinging member 114 contacts the blade 103*b* of the conveyor 103 first, so that the middle portion 114*f* of the swinging member 114 retracts from the conveyor 103, and thus the overhang portion 114*a* does not contact the side face of the blade 103*b*. In the present embodiment, with such a configuration, even if a user erroneously rotates the conveyor 103 in reverse, the swinging member 114 is not caught by the rotating blade 103*b* and does not extend over the conveyor 103.

Figure 14:
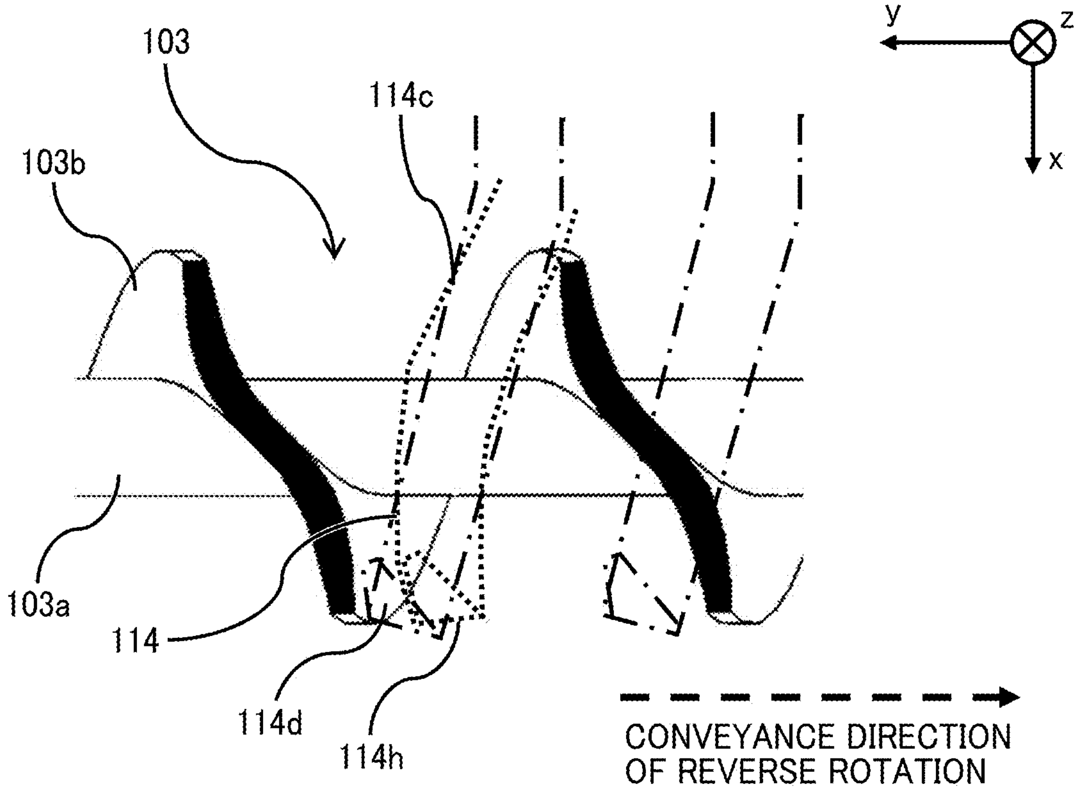
FIG. 14 is a diagram illustrating buckling of a swinging member.

FIG. 14 is a diagram illustrating buckling of the swinging member according to the present embodiment. FIG. 9 illustrates the swinging member 114 viewed from the direction of a viewpoint γ in FIG. 5A (the direction from the negative side to the positive side of the z axis in FIG. 5A). FIG. 14 illustrates the contact between the conveyor 103 and the swinging member 114. The dashed line indicates the initial position of the swinging member 114, and the broken line indicates the state in which the conveyor 103 is rotated in reverse by about ⅓ pitches from the initial position. The negative direction of the y axis is the direction in which waste toner is conveyed when the conveyor 103 is rotated in reverse. FIG. 14 illustrates a state in which the conveyor 103 is rotated from the initial position.

From the state of FIG. 14, the conveyor 103 is assumed to be rotated in reverse. In the above-described case, as illustrated in FIG. 14, when the tip portion of the swinging member 114 is pressed by rotation of the conveyor 103, the middle portion 114*f* of the swinging member 114 is caught by the reverse rotation of the conveyor 103 in the conveyance direction and buckles. The buckled swinging member 114 becomes like a swinging member 114*h*.

On the other hand, the swinging member 114 according to the present embodiment has the inclined portion 114*c* that inclines to face the conveyance direction in which toner is conveyed when the conveyor 103 rotates forward. An inclined portion 411*c* restricts buckling generated when the swinging member 114 contacts, for example, the blade 103*b* of the conveyor 103.

As described above, the swinging member according to the present embodiment is provided with the bent portion at the tip portion of the overhang portion, so that the swinging member is not caught by the rotating blade even if a user erroneously rotates the conveyor in reverse. In addition, according to the present embodiment, the swinging member is provided with the inclined portion, buckling that occurs when the swinging member contacts, for example, the blade of the conveyor can be reduced, and thus the swinging member can be reliably prevented from being caught by the blade.

As described above, in the present embodiment, the waste-toner collection container 30 (a powder collection container) includes the waste-toner ejection port 101 (a powder collection port), a conveyor 103 (a conveyor), and a swinging member 114 (a swinging member). The waste-toner ejection port 101 receives powder such as the waste toner 301. The conveyor 103 in which the blade 103*b* is spirally wound around the shaft 103*a* rotates in a specified direction and conveys the powder. The swinging member 114 contacts the conveyor 103 and is swingable. The swinging member 114 has the plurality of overhang portions 114*a* and the bent portion 114*d*. The overhang portions 114*a* are arranged in parallel at intervals in the axial direction of the swinging member 114. The bent portion 114*d* is formed by bending a part of the overhang portion 114*a* toward the blade 103*b*. The tip of the bent portion 114*d* contacts the blade 103*b* at least when the conveyor 103 rotates in a direction opposite to the specified direction.

Such a configuration can prevent the swinging member 114 from being caught by the rotation of the conveyor 103.

As described above, according to the present embodiment, the tip of the bent portion 114*d* contacts the outer edge portion of the blade 103*b*.

With such a configuration, even if a user erroneously rotates the conveyor 103 in reverse, the swinging member 114 is prevented from being caught by the rotating blade 103*b*.

As described above, according to the present embodiment, d and e are substantially equal, where d is the length of the bent portion 114*d*, and e is one half of the difference between the outer diameter of the blade 103*b* and the diameter of the shaft 103*a*.

Such a configuration can prevent the swinging member 114 from not swinging and the swinging member 114 from being caught by the rotation of the conveyor 103.

As described above, according to the present embodiment, the overhang portion 114*a* has the inclined portion 114*c* that inclines from the upstream side to the downstream side in the conveyance direction of the conveyor 103, which is the direction in which the conveyor 103 rotates in the specified direction to convey the waste toner 301 (powder).

Such a configuration can reduce buckling that occurs when the swinging member 114 contacts, for example, the blade 103*b* of the conveyor 103.

As described above, according to the present embodiment, the bent portion 114*d* is formed at the tip of the free end of the inclined portion 114*c*.

With such a configuration, even if a user erroneously rotates the conveyor 103 in reverse, the swinging member 114 is prevented from being caught by the rotating blade 103*b*.

As described above, according to the present embodiment, the relation of f/g=½ to 1 is satisfied, where the width of the inclined portion 114*c* in the conveyance direction when the inclined portion 114*c* inclines is f and the pitch of the blade 103*b* of the conveyor 103 is g.

Such a configuration can prevent the swinging member 114 from not swinging, and sufficiently achieve the effect of preventing the swinging member 114 from being caught by the rotation of the conveyor 103.

As described above, according to the present embodiment, the overhang portion 114*a* has the shaft contact portion that contacts the lower portion of the shaft 103*a*.

Such a configuration can prevent the waste toner 301 from being accumulated in the vicinity of the opening portion 101*a* and the waste toner 301 from being deposited (accumulated) on the swinging member 114.

As described above, according to the present embodiment, the swinging member 114 is formed in a substantially comb shape.

Such a configuration can prevent the waste toner 301 from accumulating on, for example, the conveyor 103 in the waste-toner collection container 30.

As described above, according to the present embodiment, the opening portion 101*a* of the waste-toner ejection port 101 is located at a position that is above the overhang portion 114*a* and is not above the conveyor 103.

With such a configuration, the accumulated waste toner 302 can be broken up and moved toward the conveyor 103, and in addition, the waste toner 301 accumulated on the swinging member 114 can be shaken off not to be cross-linked.

As described above, according to the present embodiment, the swinging member 114 has the fixing portion 114*e* for fixing the swinging member 114 at a specified position in the waste-toner collection container 30, and the specified position is higher than the lowest portion of the rotation locus 103*c* of the conveyor 103.

Such a configuration can prevent the waste toner 301 from being accumulated in the vicinity of the opening portion 101*a* and the waste toner 301 from being deposited (accumulated) on the swinging member 114.

In the present embodiment, a description is given of the case where the present disclosure is applied to the waste-toner collection container that is a powder collection container, but is not limited thereto. The present disclosure is also applicable to, for example, a powder conveying device that is a device for conveying, for example, toner or waste toner.

The above-described embodiments and modification are examples. Embodiments of the present disclosure can provide, for example, some advantages in the following aspects.

First Aspect

A powder collection container (e.g., the waste-toner collection container 30) includes a powder collection port (e.g., the waste-toner ejection port 101), a conveyor (e.g., the conveyor 103), and a swinging member (e.g., the swinging member 114). The powder collection port receives powder. The conveyor includes a blade (e.g., the blade 103*b*) spirally wound around a shaft (e.g., the shaft 103*a*), and rotates in a specified direction to convey the powder. The swinging member contacts the conveyor and is swingable. The swinging member has a plurality of overhang portions (e.g., the overhang portion 114*a*) arranged in parallel at intervals in an axial direction of the swinging member. Each of the overhang portions includes a bent portion (e.g., the bent portion 114*d*) formed by bending a part of the overhang portion toward the blade. A tip of the bent portion contacts the blade at least when the conveyor rotates in a direction opposite to the specified direction.

Second Aspect

In the powder collection container (e.g., the waste-toner collection container 30) according to the first aspect, the tip of the bent portion (e.g., the bent portion 114*d*) contacts an outer edge of the blade (e.g., the blade 103*b*).

Third Aspect

In the powder collection container (e.g., the waste-toner collection container 30) according to the second aspect, d and e are substantially equal, where d is a length of the bent portion (e.g., bent portion 114*d*), and e is one half of a difference between an outer diameter of the blade (e.g., the blade 103*b*) and a diameter of the shaft (e.g., the shaft 103*a*).

Fourth Aspect

In the powder collection container (e.g., the waste-toner collection container 30) according to any one of the first to third aspects, the overhang portion (e.g., the overhang portion 114*a*) has an inclined portion (e.g., the inclined portion 114*c*) inclined from an upstream side to a downstream side in a conveyance direction in which the conveyor (e.g., the conveyor 103) rotates in the specified direction to convey the powder.

Fifth Aspect

In the powder collection container (e.g., the waste-toner collection container 30) according to the fourth aspect, the bent portion (e.g., bent portion 114*d*) is formed at a tip of a free end of the inclined portion (e.g., the inclined portion 114*c*).

Sixth Aspect

In the powder collection container (e.g., the waste-toner collection container 30) according to the fourth or fifth aspect, a relation of f/g=½ to 1 is satisfied, where f is a width of the inclined portion in the conveyance direction when the inclined portion (e.g., the inclined portion 114*c*) is inclined and g is a pitch of the blade (e.g., the blade 103*b*) of the conveyor (e.g., the conveyor 103).

Seventh Aspect

In the powder collection container (e.g., the waste-toner collection container 30) according to any one of the first to sixth aspects, the overhang portion (e.g., the overhang portion 114*a*) has a shaft contact portion (e.g., the shaft contact portion) to contact a lower portion of the shaft (e.g., the shaft 103*a*).

Eighth Aspect

In the powder collection container (e.g., the waste-toner collection container 30) according to any one of the first to seventh aspects, the swinging member (e.g., the swinging member 114) has a substantially comb shape.

Ninth Aspect

In the powder collection container (e.g., the waste-toner collection container 30) according to any one of the first to eighth aspects, an opening portion (e.g., the opening portion 101*a*) of the powder collection port (e.g., the waste-toner ejection port 101) is disposed at a position that is above the overhang portion (e.g., the overhang portion 114*a*) and is not above the conveyor (e.g., the conveyor 103).

Tenth Aspect

In the powder collection container (e.g., the waste-toner collection container 30) according to any one of the first to ninth aspects, the swinging member (e.g., the swinging member 114) has a fixing portion (e.g., the fixing portion 114*e*) to fix the swinging member at a specified position in the powder collection container. The specified position is higher than a bottom of a rotation locus (e.g., the rotation locus 103*c*) of the conveyor (e.g., the conveyor 103).

Eleventh Aspect

In the powder collection container (e.g., the waste-toner collection container 30) according to any one of the first to tenth aspects, the powder is waste toner (e.g., the waste toner 301).

Twelfth Aspect

An image forming apparatus (e.g., image forming apparatus 1) includes the powder collection container (e.g., the waste-toner collection container 30) according to any one of the first to eleventh aspects.

Thirteenth Aspect

A powder conveying device (e.g., the first conveying screw 13*b*1, the second conveying screw 13*b*2) includes a conveyor (e.g., the conveyor 103) and a swinging member (e.g., the swinging member 114). The conveyor includes a blade (e.g., the blade 103*b*) spirally wound around a shaft (e.g., the shaft 103*a*), and rotates in a specified direction to convey the powder. The swinging member contacts the conveyor and is swingable. The swinging member has a plurality of overhang portions (e.g., the overhang portion 114*a*) arranged in parallel at intervals in an axial direction of the swinging member. Each of the overhang portions includes a bent portion (e.g., the bent portion 114*d*) formed by bending a part of the overhang portion toward the blade. A tip of the bent portion contacts the blade at least when the conveyor rotates in a direction opposite to the specified direction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A powder collection container, comprising:
- a powder collection port to receive powder;
- a conveyor to rotate in a first direction to convey the powder, the conveyor including:
  - a shaft; and
  - a blade spirally wound around the shaft; and
- a swinging member to contact the conveyor, the swinging member being swingable and including:
  - a fixing portion to fix the swinging member; and
  - a plurality of overhang portions arranged in an axial direction of the swinging member, wherein
- each overhang portion of the plurality of overhang portions includes:
  - a connecting portion connected to the fixing portion;
  - an inclined portion connected to the connecting portion, the inclined portion inclined at a first angle with respect to the connecting portion in a conveyance direction of the conveyor; and
  - a bent portion connected to the inclined portion, the bent portion positioned on a free end of the overhang portion, the bent portion inclined toward the blade at a second angle with respect to the inclined portion, and the bent portion having a tip to contact the blade when the conveyor rotates in a second direction opposite to the first direction,
- the tip of the bent portion contacts an outer edge of the blade, and
- d and e are substantially equal, where d is a length from a bed of the bent portion to a tip of the bent portion, and e is one half of a difference between an outer diameter of the blade and a diameter of the shaft.

2. The powder collection container according to claim 1, wherein the inclined portion is inclined with respect to the connecting portion from an upstream side to a downstream side in the conveyance direction in which the conveyor rotates in the first direction to convey the powder.

3. The powder collection container according to claim 2, wherein the bent portion is formed at a tip of the inclined portion.

4. The powder collection container according to claim 2, wherein
- a relation of $f/g=\frac{1}{2}$ to 1 is satisfied,
- where f is a width of the inclined portion measured in the conveyance direction when the inclined portion is inclined and g is a pitch of the blade of the conveyor.

5. The powder collection container according to claim 1, wherein each overhang portion of the plurality of overhang portions has a shaft contact portion to contact a lower portion of the shaft.

6. The powder collection container according to claim 1, wherein the swinging member has a comb shape.

7. The powder collection container according to claim 1, wherein the powder collection port has an opening portion at a position that is above each of the plurality of overhang portions and shifted from the conveyor.

8. The powder collection container according to claim 1, wherein
- the fixing portion fixes the swinging member at a position in the powder collection container, and
- the position is higher than a bottom of a rotation locus of the conveyor.

9. The powder collection container according to claim 1, wherein the powder is waste toner.

10. An image forming apparatus, comprising:

the powder collection container according to claim 1.

11. The powder collection container according to claim 1, wherein during rotation in the second direction, the tip contacts the blade before a middle portion of the respective overhang portion contacts the blade which retracts the middle portion from the conveyor.

12. The powder collection container according to claim 1, wherein the swinging member is a flexible sheet comprised of polyethylene terephthalate (PET).

13. The powder collection container according to claim 12, wherein the flexible sheet has a thickness of between 0.05 mm and 0.2 mm.

14. The powder collection container according to claim 1, wherein the second angle is between approximately 40 and 60 degrees.

15. The powder collection container according to claim 1, wherein the powder collection port includes an opening disposed at a position above the plurality of overhang portions.

16. The powder collection container according to claim 1, wherein the conveyor is a conveying screw.

17. A powder conveying device, comprising:

a conveyor to rotate in a first direction to convey the powder, the conveyor including:

a shaft; and a blade spirally wound around the shaft; and a swinging member to contact the conveyor, the swinging member being swingable and including:

a fixing portion to fix the swinging member; and a plurality of overhang portions arranged in an axial direction of the swinging member, wherein each overhang portion of the plurality of overhang portions includes:

a connecting portion connected to the fixing portion;

an inclined portion connected to the connecting portion, the inclined portion inclined at an angle with respect to the connecting portion along a conveyance direction of the conveyor; and a bent portion connected to the inclined portion, the bent portion positioned on a free end of the overhang portion, the bent portion inclined toward the blade at a second angle with respect to the inclined portion, and the bent portion having a tip to contact the blade at least when the conveyor rotates in a second direction opposite to the first direction, the tip of the bent portion contacts an outer edge of the blade, and d and e are substantially equal, where d is a length from a bed of the bent portion to a tip of the bent portion, and e is one half of a difference between an outer diameter of the blade and a diameter of the shaft.

18. The powder conveying device according to claim 17, wherein the powder conveyed by the powder conveying device is waste toner.

19. A powder collection container, comprising:

a powder collection port to receive powder;

a conveyor to rotate in a first direction to convey the powder, the conveyor including:

a shaft; and a blade spirally wound around the shaft; and a swinging member to contact the conveyor, the swinging member being swingable and including:

a fixing portion to fix the swinging member; and a plurality of overhang portions arranged in an axial direction of the swinging member, wherein each overhang portion of the plurality of overhang portions includes:

a connecting portion connected to the fixing portion, an inclined portion connected to the connecting portion, the inclined portion inclined at a first angle with respect to the connecting portion in a conveyance direction of the conveyor; and a bent portion connected to the inclined portion, the bent portion positioned on a free end of the overhang portion, the bent portion inclined toward the blade at a second angle with respect to the inclined portion, and the bent portion having a tip to contact the blade when the conveyor rotates in a second direction opposite to the first direction, and each overhang portion of the plurality of overhang portions has a shaft contact portion to contact a lower portion of the shaft.

* * * * *